(12) United States Patent
Amemiya et al.

(10) Patent No.: US 8,266,298 B2
(45) Date of Patent: Sep. 11, 2012

(54) STORAGE MEDIUM, UNIQUENESS ASSURANCE REALIZING METHOD, SESSION MANAGEMENT METHOD AND UNIQUENESS ASSURANCE INFORMATION SETTING MANAGEMENT DEVICE

(75) Inventors: Kouichirou Amemiya, Kawasaki (JP); Hitoshi Ueno, Kawasaki (JP); Masaaki Takase, Kawasaki (JP); Kenichi Abiru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 384 days.

(21) Appl. No.: 12/571,737

(22) Filed: Oct. 1, 2009

(65) Prior Publication Data

US 2010/0088417 A1   Apr. 8, 2010

(30) Foreign Application Priority Data

Oct. 3, 2008   (JP) ................................. 2008-259114
Jun. 3, 2009   (JP) ................................. 2009-134402

(51) Int. Cl.
*G06F 15/16* (2006.01)
(52) U.S. Cl. ........................ 709/227; 709/223
(58) Field of Classification Search .................. 709/227, 709/228

See application file for complete search history.

(56) References Cited

U.S. PATENT DOCUMENTS

| 2002/0032777 | A1* | 3/2002 | Kawata et al. | 709/226 |
| 2002/0143955 | A1* | 10/2002 | Shimada et al. | 709/227 |
| 2005/0246355 | A1* | 11/2005 | Ito | 707/100 |
| 2007/0121596 | A1* | 5/2007 | Kurapati et al. | 370/356 |

FOREIGN PATENT DOCUMENTS

| JP | 2004-247916 | 9/2004 |
| JP | 2005-318439 | 11/2005 |
| JP | 3963690 | 6/2007 |

OTHER PUBLICATIONS

Anders Kristensen. "SIP Servlet API Version 1.0" Dynamicsoft Inc., Feb. 4, 2003.

* cited by examiner

*Primary Examiner* — Wing Chan
*Assistant Examiner* — Andrew Woo
(74) *Attorney, Agent, or Firm* — Katten Muchin Rosenman LLP

(57) ABSTRACT

One system distributes a request for providing a service using a first communication protocol, from a terminal device to a server selected from among a plurality of servers by a server load balancer in response to the request. A corresponding relation between identification information for identifying a session generated in a distributed server and the server that has generated the session corresponding to the identification information is set in the server load balancer by the service of a second communication protocol as uniqueness assurance information for uniqueness assurance. Thus, when the provision of a service is requested using a second communication protocol by the terminal device, the server load balancer refers to the set uniqueness assurance information and selects the server for providing the service from among the plurality of servers.

9 Claims, 28 Drawing Sheets

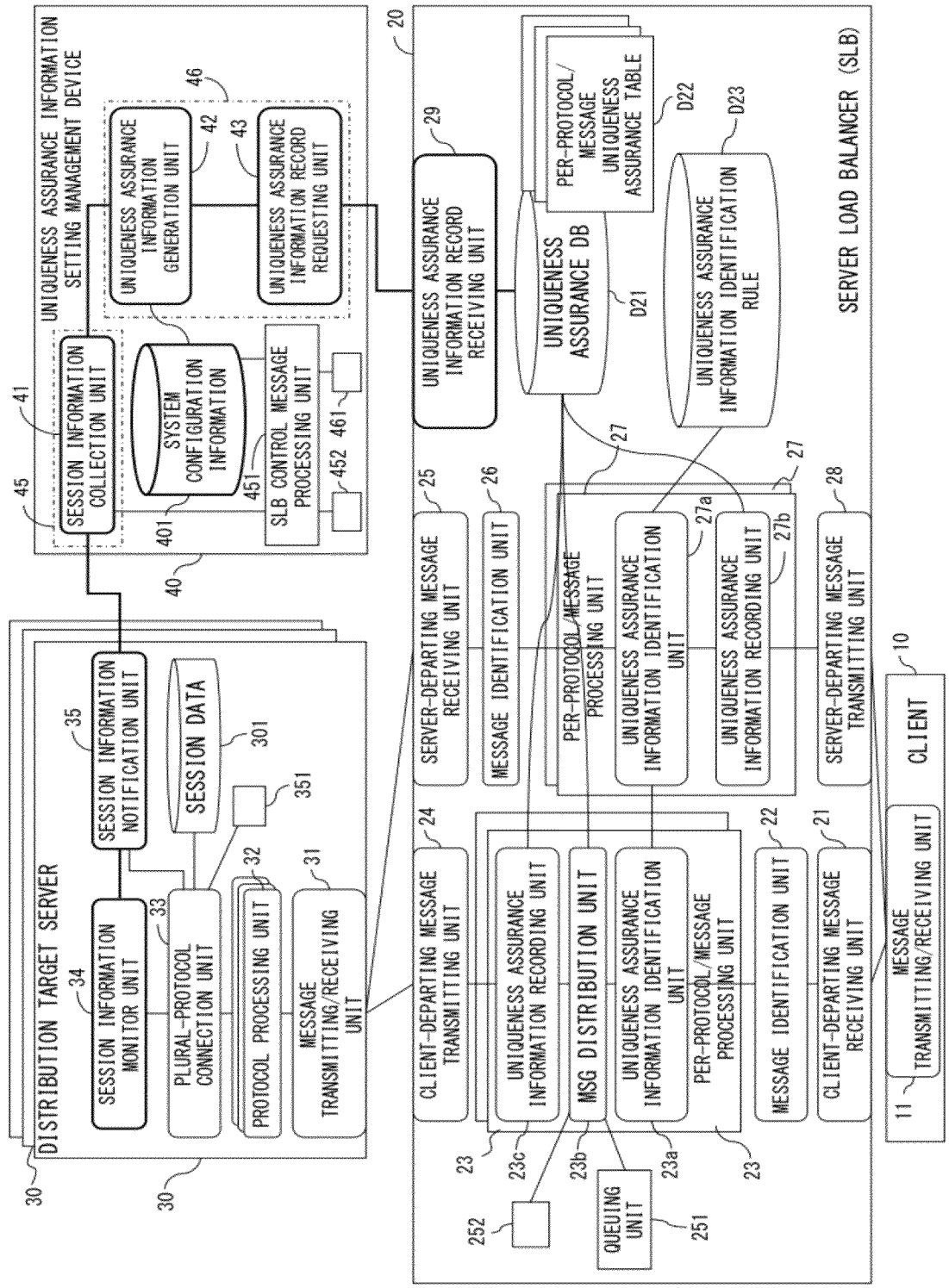
F I G. 4

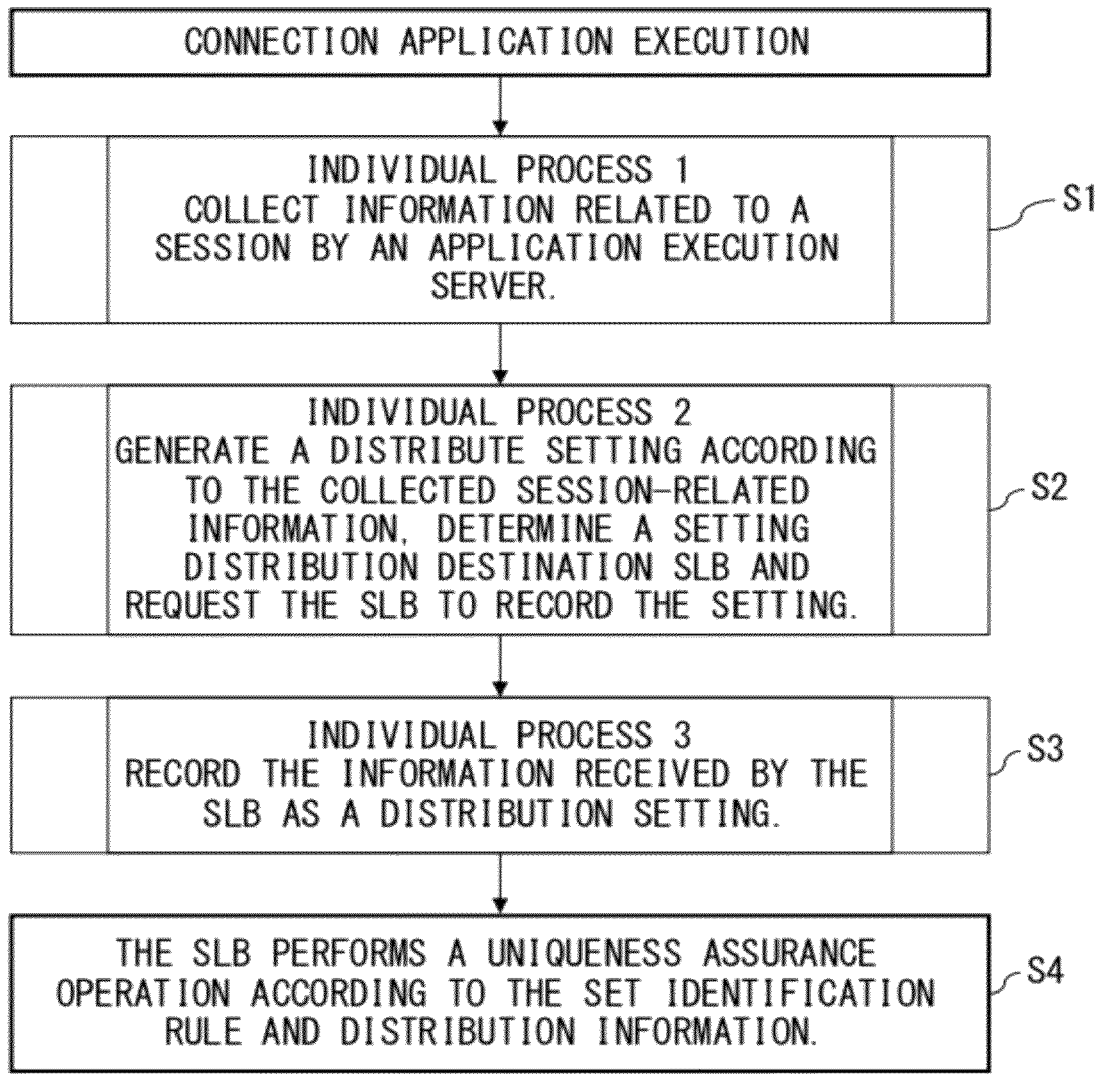
F I G. 5

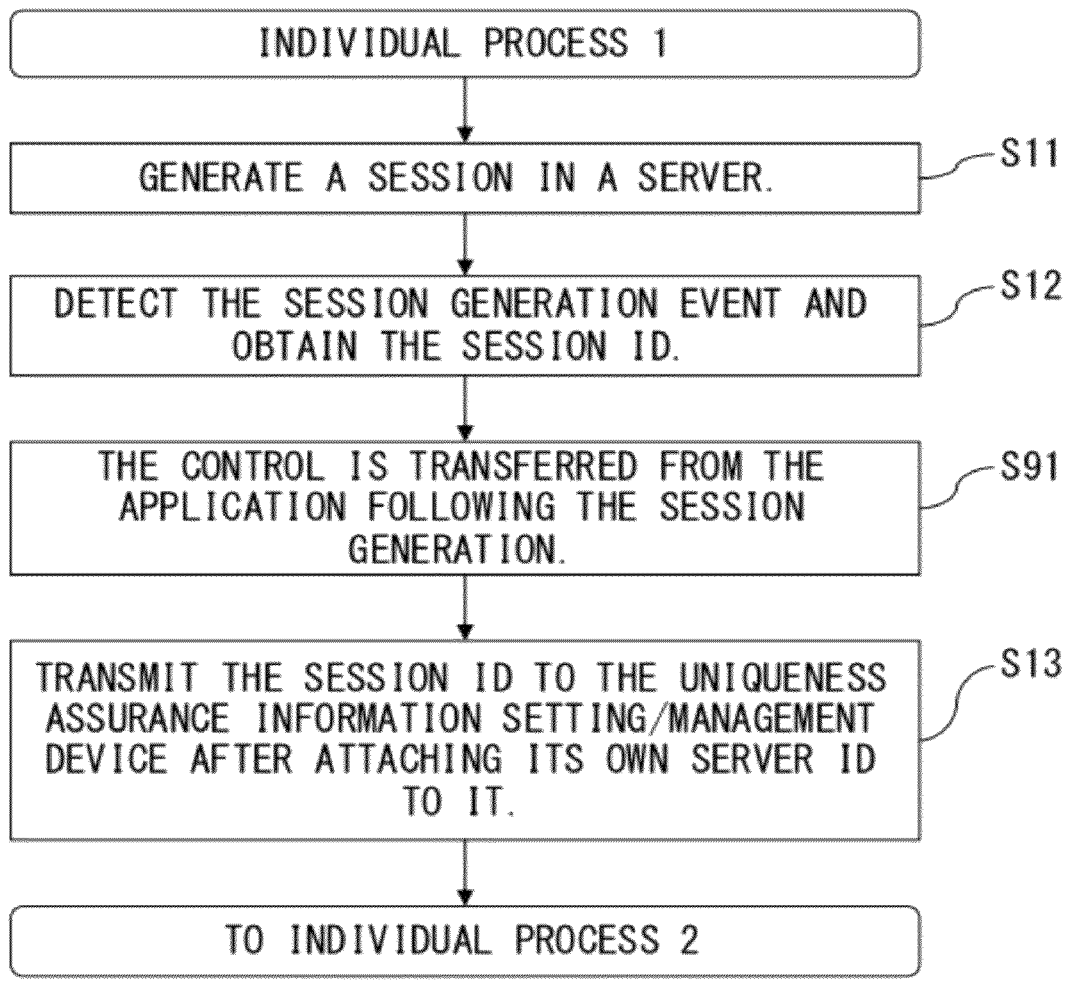
F I G. 1 1

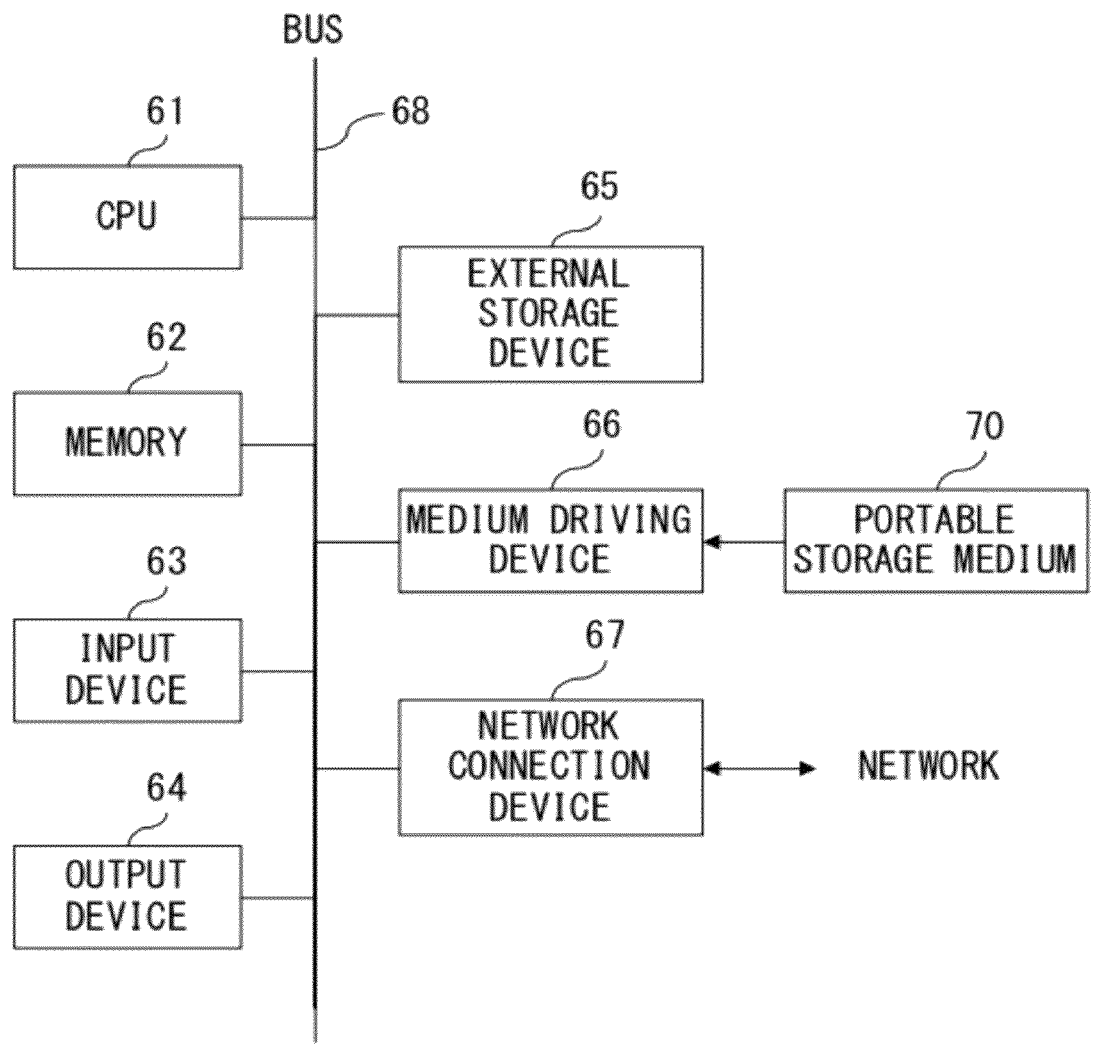
F I G. 1 9

| TARGET ID | STARTING TIME |
|---|---|
| ID6384 | 12:30 |
|  |  |

FIG. 20

| TARGET ID | SERVER ADDRESS | STATE | LATEST UPDATE |
|---|---|---|---|
| ID6384 | IP4 | BUFFER START NOTICE | 12:30 |
| | | | |

FIG. 21

| TARGET ID | Timeout | NOTICE TIME |
|---|---|---|
| ID6384 | 12:25 | 12:25 |
| ID6850 | 13:26 | 12:26 |

FIG. 22

| ID | ACTIVATION TIME | GENERATED EVENT |
|---|---|---|
| ID6834 | 12:34 | DELETION STOPPAGE NOTICE |
| ID6800 | 12:40 | DELETION STOPPAGE NOTICE |

FIG. 28

STORAGE MEDIUM, UNIQUENESS ASSURANCE REALIZING METHOD, SESSION MANAGEMENT METHOD AND UNIQUENESS ASSURANCE INFORMATION SETTING MANAGEMENT DEVICE

CROSS-REFERENCE TO RELATED APPLICATION

This application is based upon and claims the benefit of priorities of the prior Japanese Patent Application No. 2009-134402, filed on Jun. 3, 2009 and No. 2008-259114, filed on Oct. 3, 2008, the entire contents of which are incorporated herein by reference.

FIELD

The embodiments discussed herein are related to a technology for realizing uniqueness assurance for distributing related requests (messages) from a terminal device of a plurality of servers capable of providing services by a plurality of communication protocols to the same server.

BACKGROUND

For the load distribution of a server, a SLB (server load balancer) is used. The SLB distributes requests (messages) from a terminal device being a client to one of a plurality of servers according to an autonomous distribution algorithm, such as a round robin method or the like. A session being the unit of time information is exchanged is generated in a server by the distribution and a session ID (identification information) for uniquely identifying the session is reported to the terminal device via the SLB.

The SLB registers a relation between the session ID and a server storing a session having the ID in a distribution table. The terminal device requests by a message storing the session ID in its header. The SLB distributes the message to a server having the session by referring to the distribution table with the session ID stored in the header of the message. Thus, the SLB has a function to distribute messages from the same terminal device to the same server while the session continues. This function is called a uniqueness assurance function (or session maintenance function).

FIGS. 1 and 2 explain a method for realizing uniqueness assurance. FIG. 1 explains a method for realizing uniqueness assurance by SIP (session initiation protocol) used in the Internet telephone and the like. FIG. 2 explains a method for realizing uniqueness assurance by HTTP (hypertext transfer protocol) used for a Web server to transmit/receive data to/from a terminal device (browser).

A plurality of servers 1730 is virtually realized by an SLB 1720 and is accessed by a client 1710 being a terminal device as virtual servers. A request for a service using an SIP, from the client 1710 is transmitted by a message (packet) using the destination address of a transport header as the address of the virtual server. An identification call ID is stored in the SIP header of the message.

The destination address (Dst) of the transport header of the message transmitted from the client 1710 is converted to one address of the servers 1730 and distributed by the SLB 1720. An SIP session 1732 is generated in a server 1730 corresponding to the client 1710 by the distribution. The server 1730 generates a message storing the call ID assigned to the session 1732 in the SIP header and the address of its own server 1730 as the transmitting source address (Src) of a transport header and transmits the message to the SLB 1720 via an SIP I/F 1731.

The SLB 1720 registers the combination of the call ID and the address of the server 1730 in an SIP distribution table 1721, using the call ID as session identification information. The SLB 1720 converts the transmitting source address stored in the transport header of the message received from the server 1730 to the address of a virtual server and transmits the message to the SIP client 1710.

After that the client 1710 transmits a message storing a call ID in the SIP header and the address of the virtual server as the destination address of the transport header. The SLB 1720 refers to the distribution table 1721, specifies a server 1730 that is the transmitting destination of the message on the basis of the call ID in the SIP header and transfers the message to the specified server 1730. For the purpose of the transfer, the destination address of the transport header is converted to the address of the server 1730. The transmitting source address of the transport header of the message transmitted from the server 1730 is converted to the address of a virtual server. Thus, the SLB 1720 enables the same server 1730 to process the message transmitted from the client 1710 while the session 1723 is stored. As a result, uniqueness assurance can be realized.

Even a communication protocol changes from an SIP to an HTTP, as illustrated in FIG. 2, uniqueness assurance can be realized by the same method. In the HTTP, the message from the client 1710, distributed by the SLB 1720 is received by the HTTP I/F 1735 of the server 1730 and an HTTP session 1736 is generated. The server 1730 generates a message storing the session ID assigned to the session 1736 in the cookie of the HTTP header and transmits the message to the SLB 1720 via the I/F 1735.

The SLB 1720 registers the combination of the session ID and the address of the server 1730 in the HTTP distribution table 1722. The transmitting source address stored in the transport header of the message received from the server 1730 is converted to the address of a virtual server and is transmitted to the client 1710. Thus, after that, uniqueness assurance can be realized by referring to the distribution table 1722 and determining the transfer destination of the message received from the client 1710.

Both the combination of the call ID and the address of the server 1730 that is registered in the distribution table 1721 and the combination of the session ID and the address of the server 1730 that is registered in the distribution table 1722 are information for realizing uniqueness assurance. For that reason, hereinafter they are generally called "uniqueness assurance information".

However, for example, in the field of the SDP (service discovery protocol) of an NGN (next generation network), a service obtained by combining a plurality of communication protocols which is generally called requestable application program (hereinafter called "connected application") (an application program is briefly called "application" or "appli") is provided. There are one capable of displaying call information via an HTTP after the call establishment of an SIP, one capable of performing the call control of an SIP via a Web page and the like in the connected application. As typical example of such a connected application, there is a CSBNA (Call Schedule on Busy or No Answer) application which can e an SIP and an HTTP.

In the connected application, in is necessary for a server in which a session is generated via a certain communication protocol to be also reached via another communication protocol in order to realize a connection among communication protocols. In other words, it is necessary to realize uniqueness assurance in order to connect communication protocols. However, the SLB selects a server to which a message is distributed for each communication protocol. Therefore, when connecting a plurality of communication protocols, uniqueness assurance cannot be supported by a plurality of communication protocols.

FIG. 3 is a conventional sequence chart illustrating the operations of a client, an SLB and a server in the case where load is distributed by the SLB arranged before a server group. This sequence chart indicates the case where although a client being a terminal device used by Alice requests for the start of communications with a client used by Bob using an SIP, the communications cannot be started and then the client used by Alice accesses a URL (uniform resource locator) using an HTTP. It is assumed that the communications is conducted via an SIP server 1730 being one server of the server group.

In FIG. 3 each of the clients used by Alice and Bob describes a logical entity for each communication protocol. A UA (user agent) for processing an SIP message, being one client is described as "ASU" ("Alice's SIP UA") and "BSU" ("Bob's SIP UA") in the client used by Alice and the client used by Bob, respectively. Reference numerals 1711 and 1713 are attached to ASU and BSU, respectively. A browser executed by the client of Alice is described as "AB" ("Alice's browser") and a reference numeral 1712 is attached to it. When there is no need to refer to its logical entity, it is described as "client 1710" as described in FIGS. 1 and 2.

The SLB 1720 includes a transmission/reception identification unit 1725, an SIP processing unit 1726 and an HTTP processing unit 1727. The transmission/reception discrimination unit 1725 identifies communications with the client 1710 and a communication protocol on the basis of a message transmitted by the client 1710. The SIP processing unit 1726 processes a message (SIP message) transmitted by an SIP. The HTTP processing unit 1727 processes a message (HTTP message) transmitted by an HTTP.

The SIP server 1730 includes a CSBNA application (described in FIG. 3 as "CSBNA APPLI") 1733 and a session (described in FIG. 3 as "APPLI SESSION #1") 1732 generated in response to the request of the SIP UA 1711.

Firstly, the SIP UA 1711 performs a process in step SB41 according to the instruction of Alice and transmits an INVITE request to the SLB 1720 in order to start communications with Bob (sequence S2101). A call ID (described in FIG. 3 as "Call-ID#1") by the SIP UA 1711 is stored in the SIP header of a message for the INVITE request. This INVITE request is identified an SIP message by the transmission/reception identification unit 1725 executing step SD41 and is transmitted to the SIP processing unit 1726 (sequence S2102). The SIP processing unit 1726 determines a distribution destination by executing step SE41 and transmits it to the SIP server 1730 (sequence S2103). In order to realize uniqueness assurance, it registers the combination of the call ID and the address of the distributed SIP server 1730 in the distribution table 1721 as uniqueness assurance information (sequence S2104).

The CSBNA application 1733 of the SIP server 1730 executes step SH41, determines a call ID to be used on the Bob side (call receiving side) and returns the INVITE request storing the call ID in the SIP header to the SLB 1720 (sequence S2105).

However, the CSBNA application 1733 generates a 100Trying response for notifying a calling party of being under processing and transmits it to the calling party (sequence S2131). This response is identified by the transmission/reception identification unit 1725 executing step SD43 and is transferred to the SIP processing unit 1726 (sequence S2132). The SIP processing unit 1726 transmits the 100Trying response to the client 1710 used by Alice by executing step SE43. As a result, the 100Trying response is processed by the SIP US 1711 executing step SB42.

The INVITE request transmitted from the SIP server 1730 is identified as an SIP message by the transmission/reception identification unit 1725 executing step SD42 and is transmitted to the SIP processing unit 1726 (sequence S2106). The SIP processing unit 1726 executes step SE 42 and registers the combination of the call ID and the address of the SIP server 1730 in the INVITE request in the distribution table 1721 as uniqueness information (sequence S2107). Then, it transmits the INVITE request to the client 1710 used by Bob (sequence S2108).

The INVITE request transmitted to the client 1710 used by Bob is processed by the SIP UA 1713 executing step SC41. In this case, a 486Busy response for notifying the transmitting source (Alice) of the fact that communications cannot be started for the reason that it is conducting other communications or the like is transmitted (sequence S2109).

The 486Busy response is identified by the transmission/reception identification unit 1725 of the SLB 1720 executing step SD44 and is transferred to the SIP processing unit 1726 (sequence S2110). The SIP processing unit 1726 refers to the distribution table 1721 using the call ID in the 486Busy response by executing step SE44 and specifies an SIP server 1730 to which this response should be distributed (sequence S2111). Thus, this response is transmitted to the specified SIP server 1730 (sequence S2112).

The CSBNA application 1733 of the SIP server 1730 executes step SH42 and processes the received 486Busy response. Thus, it generates a session 1732 (sequence S2113). In the session 1723, step SI41 is executed and its ID is returned (sequence S2114). The CSBNA application 1733 stores the calling party (SIP-URI (Uniform Resource Identifier) of Alice in this case) and the receiving party (SIP-URI of Bob in this case) as the data of the session 1732 (sequence S2116 and step SI42). Then, when the response is retuned from the session 1732 (sequence S2116), the obtained session ID is embedded in a URL for accessing via an HTTP and a 302 response (Redirect) describing the URL in its contact URI header is transmitted to the SLB 1720 (sequence S2117). When the 486Busy response is returned from the SIP UA 1713 of Bob, the 302 response is transmitted in order to urge the calling party to take other countermeasures.

This 302 response is identified by the transmission/reception identification unit 1725 executing step SD45 and is transferred to the SIP processing unit 1726 (sequence S2118). The SIP processing unit 1726 transmits the 302 response to the client 1710 used by Alice by executing step SE45 (sequence S2119). The 302 response transmitted to the client 1710 is processed by the SIP UA 1711 executing step SB43. Thus, the browser 1712 is activated (sequence S2120).

The activated browser 1712 transmits an HTTP GET request for accessing a URL described in the contact URI header of the 302 response by executing step SA41 (sequence S2121). This request is identified by the transmission/reception identification unit 1725 of the SLB 1720 executing step SD46 and is transferred to the HTTP processing unit 1727 (sequence S2122). The HTTP processing unit 1727 extracts the session ID from the URL specified by the HTTP GET request by executing step SF41 and refers to the distribution table 1722 (sequence S2123).

At the time of this reference, the HTTP GET request is the first HTTP message received from the client 1710 used by Alice. Therefore, the session ID extracted from the URL specified by the request is not registered in the distribution table 1722. Therefore, it is an autonomous distribution target.

As a result, it cannot be assured that the HTTP GET request is distributed to the same SIP server 1730 as the SIP message.

When the HTTP message is distributed to a server 1730 different from the SIP server 1730 for distributing the SIP message, the session 1732 specified by the session ID included in the URL does not exist in the different server 1730. Thus, an error occurs and the process cannot be continued. Therefore, even when load is distributed among a plurality of servers, it is important to take into consideration the uniqueness assurance of connections among a plurality of communication protocols.

It is common to delete a session generated in a server on a condition that no request for it is received from a terminal device for a certain time. This is mainly because the waste of resources due to the existence of an unnecessary session or a session having a high possibility of being unnecessary.

The time set as a condition for deleting a session (hereinafter called "timeout time") is determined taking various states into consideration. However, sometimes there is a fairly long time until a server receives a request after it is transmitted from a terminal device, depending on the traffic of a communication network connecting the terminal device and the SLB, the load state of an SLB and the like. In that case, there is a possibility that although a request is transmitted from the terminal with timing the session is essentially deleted (timing no timeout occurs), the server deletes the session.

When the server receives the request after deleting the session too, an error occurs. It is preferable to suppress the frequency of an error process in order to reduce the load of a server. However, even when a request is transmitted from a terminal device with timing no timeout occurs, sometime timeout occurs due to the increase of transmission time by the traffic in a communication network (telecommunication line) or the like. Therefore, in the realization of uniqueness assurance, it is also important to appropriately cope with the increase of a transmission time in order to suppress the load of a server.

As technical reference literatures, there are Japanese Laid-open Patent Publication Nos. 2004-247916 and 2005-318439, Japanese Patent No. 3963690 and Dynamicsoft Inc., "SIP Servlet API, Version 1.0" (Feb. 4, 2003).

SUMMARY

One system to which the present invention is applied obtains identification information for identifying a session that a server load balancer generates on a server selected from among a plurality of servers from a request for service provision using a first communication protocol, from a terminal device and sets a corresponding relation between the obtained information and the server that generates a session corresponding to the identification information in the server load balancer as the uniqueness assurance information for uniqueness assurance of a service by a second communication protocol. When the provision of a service using the second communication protocol is requested by the terminal device, the system enables the server load balancer to refer to the set uniqueness assurance information and to select a server that provides the service from among the plurality of servers.

The uniqueness assurance information for uniqueness assurance is set in the server load balancer by the second communication protocol, assuming that the terminal device that asks for the request asks a request using the second communication protocol, using the fact that a session is generated by a request using the first communication protocol as a trigger. Therefore, a request using the second communication protocol, transmitted from the terminal after setting the uniqueness assurance information is distributed to a server that has generated the session by the request using the first communication protocol, transmitted from the terminal device. As a result, even when a plurality of communication protocols is connected, uniqueness assurance can be realized. In another system to which the present invention is applied, when a session generated by a server load balancer distributing the request of a terminal device is deleted, a server notifies the server load balancer of the deletion in advance, monitors whether a request corresponding to the session has been transmitted from the terminal device before the session should be actually deleted after the notice is issued and stops the deletion of the session that is reported when the transmission of a corresponding request is confirmed by the monitor.

By providing a monitor period during which the above-described monitor is performed, even when a transmission time needed until a request transmitted from a terminal device is actually received by a server is increased (delayed) by some reason, the increase can be absorbed by the monitor time. As a result, uniqueness assurance appropriately corresponding to the increase of a transmission time can be realized.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 illustrates the configuration of a communication network system composed using a uniqueness assurance information setting management device according to the first preferred embodiment.

FIG. 5 illustrates the flow of the process performed by an SLB 20, a distribution target server 30 and a uniqueness assurance information setting management device 40 when a message is transmitted from a client 10.

FIG. 11 is the flowchart of an individual process 1 (the second preferred embodiment).

FIG. 19 illustrates one example of the hardware configuration of a computer to which the present invention can be applied.

FIG. 20 explains the composition of a buffer target ID table.

FIG. 21 explains the composition of a deleted ID management table.

FIG. 22 explains the composition of a result data management table.

FIG. 28 explains the composition of a timer management table.

DESCRIPTION OF EMBODIMENTS

Figure 1:
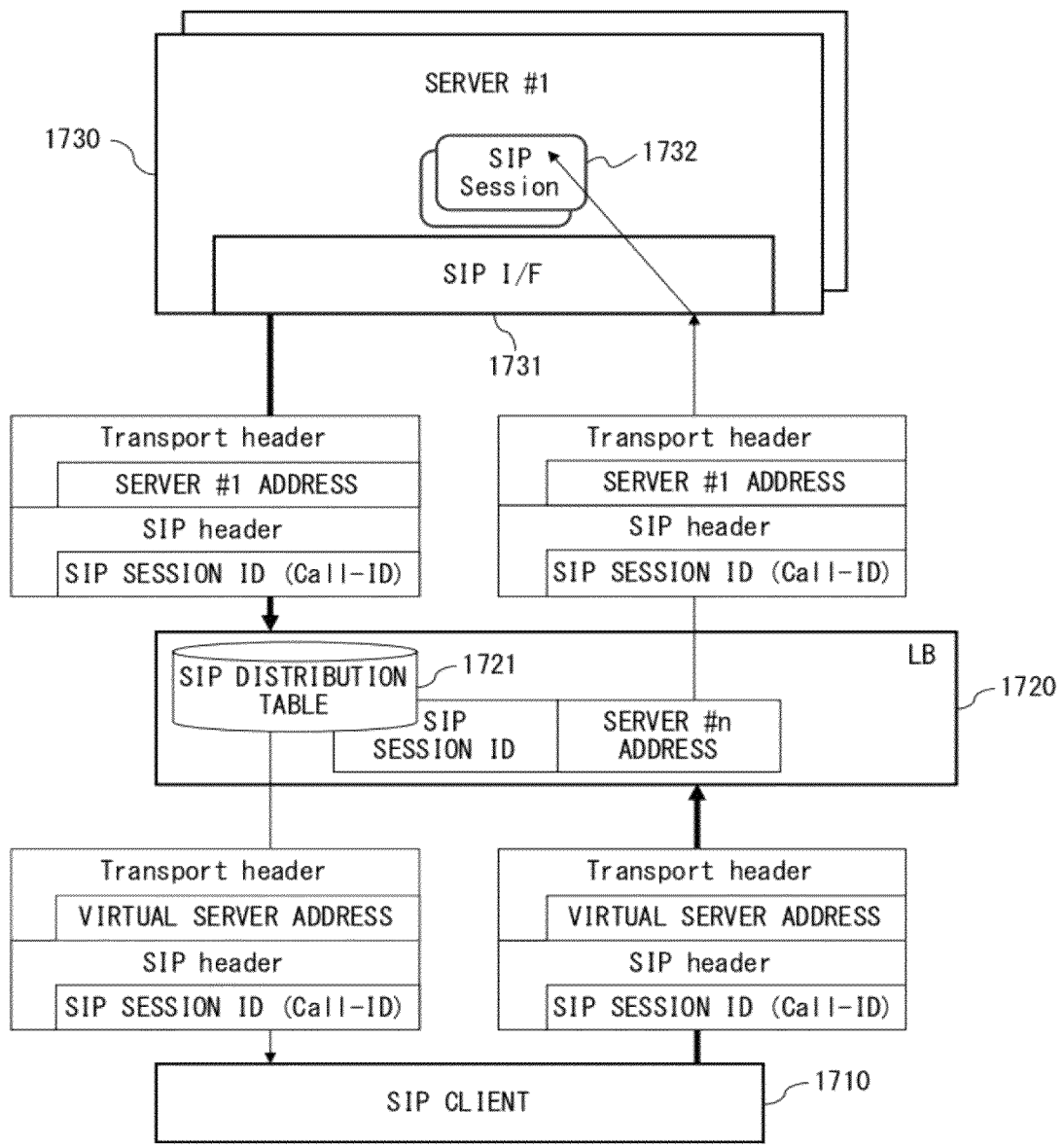
FIG. 1 explains how to realize uniqueness assurance (in the case of an SIP).
Figure 2:
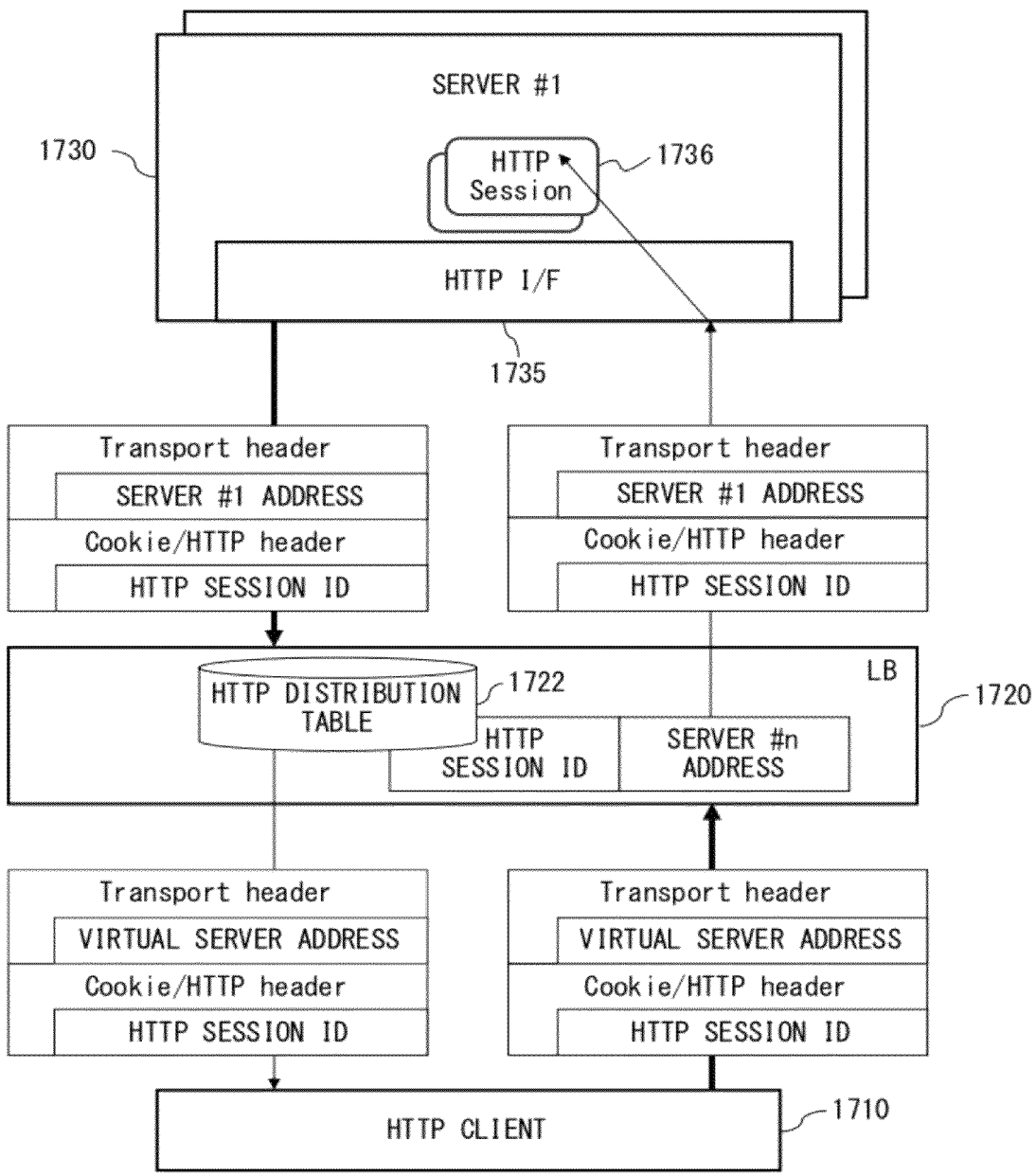
FIG. 2 explains how to realize uniqueness assurance (in the case of an HTTP).

Preferred embodiments of the present invention will be explained below with reference to the drawings.

(a) First Embodiment

FIG. 4 illustrates the configuration of a communication network system composed using a uniqueness assurance information setting management device according to the first preferred embodiment. The communication network system is configured in such a way that an SLB (Server Load Balancer) 20 selects a distribution target server 30 for distributing requests from a client 10 being a terminal device from among a plurality of distribution target servers 30 by arranging the SLB 20 before a plurality of distribution target servers 30 corresponding to a plurality of communication protocols. A uniqueness assurance information setting management device 40 according to this preferred embodiment can realize uniqueness assurance enabling connections among the plurality of communication protocols by monitoring a session generated in a distribution target server 30 by distribution of the SLB 20 and setting information (uniqueness assurance information) for uniqueness assurance for a communication protocol different from a communication protocol that generates the session in the SLB 20. The client 10 and the SLB 20 are connected by a communication network, such as the Internet or the like, and the SLB 20, the plurality of distribution target servers 30 and the uniqueness assurance information setting management device 40 are connected to each other by a communication network, such as a LAN or the like.

The client 10 transmits a message (packet) to the SLB 20 via a message transmitting/receiving unit 11. The message is received by the client-departing message receiving unit 21 of the SLB 20, is transferred to a message identification unit 22 and the communication protocol of the message is identified. A plurality of per-protocol/message processing units 23 is arranged after the message identification unit 22 for each communication protocol (message). The message identification unit 22 transfers the message to a corresponding per-protocol/message processing units 23 according to the identification result.

Each per-protocol/message processing unit 23 includes a uniqueness assurance information identification unit 23a, an MSG distribution unit 23b and a unique assurance information recording unit 23c. Each of the units 23a through 23c operates as follows.

The uniqueness assurance information identification unit 23a identifies (extracts) the identification information (for example, session ID or call ID) of uniqueness assurance information existing in the message of a corresponding communication protocol. The identification is performed by referring to a uniqueness assurance information identification rule 203. The information of a position in which the identification information of uniqueness assurance information is stored for each communication protocol and for each message is defined in the identification rule 203.

The MSG distribution unit 23b refers to a uniqueness assurance DB 201 and a uniqueness assurance table 202 prepared for each communication protocol/message, using the identification information identified by the uniqueness assurance information identification unit 23a and determines a distribution target server 30 for distributing messages. Identification information for uniquely specifying the session and identification information for uniquely specifying a distribution target server 30 having the session are stored for each session generated in the distribution target servers 30 in the uniqueness assurance DB 201 and each uniqueness assurance table 202 as uniqueness assurance information. Therefore, if the identification information identified by the uniqueness assurance information identification unit 23a is stored in either the uniqueness assurance DB 201 or the uniqueness assurance table 202, a distribution target server 30 indicated by another identification information in the uniqueness assurance information having the identification information is determined as the distribution destination. If the identification information identified by the uniqueness assurance information identification unit 23a is stored in neither the uniqueness assurance DB 201 nor the uniqueness assurance table 202, the distribution destination is autonomously determined by a round robin method or the like. The identification information of the distribution target server 30 that is then determined as the distribution destination is stored in the uniqueness assurance table 202. After that, an "address" is assumed to be used as the identification information of the distribution target server 30 in order to avoid confusion. Alternatively, the identification information can be a number, a name or the like assigned to the distribution target server 30.

The uniqueness assurance information recording unit 23c stores the identification information of a session in the uniqueness assurance DB 201 according to the type of a message. The identification information to be stored is, for example, a call ID in the SIP. In the HTTP the identification information is not usually stored.

The per-protocol/message processing unit 23 to which a message is transferred from the message identification unit 22 thus determines the distribution destination of the message. A client-departing message transmitting unit 24 transmits a message to one of the plurality of distribution target servers 30 according to the determination.

The above-described uniqueness assurance DB 201 is used to store uniqueness assurance information set by the SLB itself. The per-protocol/message uniqueness assurance table 202 corresponding to the uniqueness assurance information is used to store uniqueness assurance information set by the uniqueness assurance information setting management device 40. The distribution destination of a message is determined by referring to each per-protocol/message uniqueness assurance table 202 besides the uniqueness assurance DB 201. Therefore, uniqueness assurance can be realized even when a plurality of communication protocols are connected.

The message transmitted from the distribution target server 30 is received by a server-departing message receiving unit 25 and the communication protocol is identified by the message identification unit 26. Thus, the message is transferred to one of a plurality of per-protocol/message processing units 27 for each communication protocol (message) positioned after the message identification unit 26.

Each per-protocol/message processing unit 27 includes a uniqueness assurance information identification unit 27a and a uniqueness assurance information recording unit 27b. The uniqueness assurance information identification unit 27a refers to the uniqueness assurance information identification rule 203 and identifies (extracts) the identification information of the uniqueness assurance information existing in the message. The uniqueness assurance information recording unit 27b stores the identification information in the uniqueness assurance DB 201 if necessary. The identification information is stored in the case of the message of the communication protocol whose identification information is determined by the generation of a session. The identification information extracted from the message is stored as the identification information of the session of uniqueness assurance information having only the address of the distribution target server 30 on the condition that the uniqueness assurance information having the address of the distribution target server 30 that has received the message and the identification information in the message is not stored in the uniqueness assurance DB 201.

The message processed thus is transmitted to the client 10 via a server-departing message transmitting unit 28.

However, each distribution target server 30 receives the message transmitted from the SLB 20 by a message transmitting/receiving unit 31 and transfers the message to a protocol processing unit 32 corresponding to the communication protocol of the message. A plural-protocol connection unit 33 for individually providing services is positioned after the protocol processing unit 32. This plural-protocol connection unit 33 provides a service in which a plurality of communication protocols is connected. The protocol processing unit 32 to which the message is transferred analyzes the message and transfer the message to the plural-protocol connection unit 33. The plural-protocol connection unit 33 can be realized by the distribution target server 30 executing an application in which a plurality of communication protocols can be connected. It is because the plural-protocol connection unit 33 is a target for realizing uniqueness assurance capable of connecting a plurality of communication protocols that only the plural-protocol connection unit 33 is illustrated in FIG. 4 as a component capable of providing a service. Therefore, only the plural-protocol connection unit 33 is focused as a service provision unit.

The plural-protocol connection unit 33 generates the session of the communication protocol corresponding to the protocol processing unit 32 from the message transferred from the protocol processing unit 32 and stores the data (session data 301) of the session. The session data 301 includes identification information for uniquely specifying a session and data accompanying the session. In this example, it is assumed that a session ID is used as the identification information.

A session information monitor unit 34 monitors session generated by the service provision unit (application) and when a session is generated, it transfers, for example, its session ID to a session information notification unit 35. The session information notification unit 35 transmits identification information for uniquely specifying the session ID and a distribution target server that has generated the session of the session ID, such as the address of the distribution target server 30 to the uniqueness assurance information setting management device 40 in the form of a message.

The uniqueness assurance information setting management device 40 receives the message transmitted from the distribution target server 30 by a session information collection unit 41. The received message is transferred to a uniqueness assurance information generation unit 42. The uniqueness assurance information generation unit 42 generates uniqueness assurance information to be set in the SLB 20 by the corresponding relation between the session ID indicated by the transferred message and the distribution target server 30, refers to system configuration information 401 and determines an SLB 20 to be requested to set the generated uniqueness assurance information.

The system configuration information 401 indicates identification information for uniquely specifying an SLB positioned before the distribution target server 30, such as its address for each distribution target server 30. Uniqueness assurance information can be set for each service provision system provided with a plurality of distribution target servers 30 by referring to the system configuration information 401.

A uniqueness assurance information record requesting unit 43 transmits the message for requesting for the setting of the uniqueness assurance information generated by the uniqueness assurance information generation unit 42 to the SLB 20 determined by the uniqueness assurance information generation unit 42.

The message transmitted from the uniqueness assurance information setting management device 40 thus is received by the uniqueness assurance information record receiving unit 29 of the SLB 20. This uniqueness assurance information record receiving unit 29 transfers the received message to its corresponding per-protocol/message processing unit 27 and makes it to process it. Thus, the uniqueness assurance information in the message is recorded in the corresponding per-protocol/message uniqueness assurance table 202. The per-protocol/message uniqueness assurance table 202 storing communication protocols is, for example, used for another communication protocol specified by the communication protocol by which the session has generated by the distribution target server 30. More specifically, if the communication protocol that has generated the session is an SIP, another communication protocol is an HTTP. Even when a plurality of communication protocols are connected, related messages transmitted from the same client 10 by each of a plurality of communication protocols are distributed to the same distribution target server 30 by recording the uniqueness assurance information requested by the uniqueness assurance information setting management device 40 in one or more per-protocol/message uniqueness assurance tables 202. As a result, uniqueness assurance can be realized.

Then, the operations of the SLB 20, a distribution target server 30 to which a message is distributed by the SLB 20 and the uniqueness assurance information setting management device 40 will be explained in more detail with reference to the flowcharts illustrated in FIGS. 5 through 8 and the sequence chart illustrated in FIG. 9.

FIG. 5 illustrates the flow of a process performed by the SLB 20, the distribution target server 30 and the uniqueness assurance information setting management device 40 when a message is transmitted from the client 10. It is one in which no session is generated by any distribution target server 30 that is assumed to be used as a message to be transmitted from the client 10. The respective processes performed by the distribution target server 30, the uniqueness assurance information setting management device 40 and the SLB 20 in order to set uniqueness assurance information in the SLB 20 by the session generation of the distribution target server 30 will be explained in detail below with reference to FIGS. 5 through 8.

Firstly, in step S1, an individual process 1 is performed in a distribution target server 30 that generates a session by distributing a message. The information of the generated session is transmitted to the uniqueness assurance information setting management device 40 by the distribution target server 30 performing this individual process 1.

Then, in step S2, an individual process 2 is performed in the uniqueness assurance information setting management device 40 that has received the information of the session from the distribution target server 30. Uniqueness assurance information is generated by the uniqueness assurance information setting management device 40 performing this individual process 2, and the setting of the generated uniqueness assurance information is requested for the SLB 20.

Then, in step S3, an individual process 3 is performed in the SLB 20 for which the setting of the uniqueness assurance information is requested. The uniqueness assurance information is recorded on the per-protocol/message uniqueness assurance table 202 by the SLB 20 performing this individual process 3. As a result, even if it is a different communication protocol, the process of the SLB 20 advances to step S4 for realizing uniqueness assurance.

Figure 6:
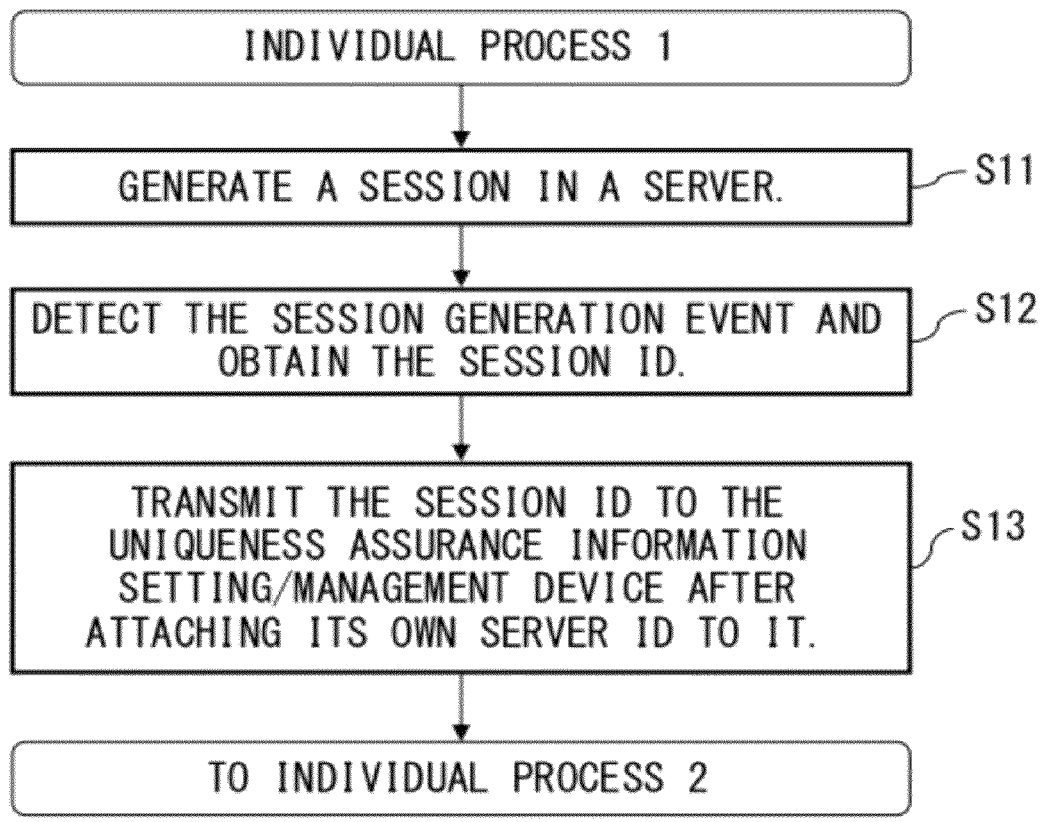
FIG. 6 is the flowchart of an individual process 1.

FIG. 6 is the flowchart of the above-described individual process 1. This individual process 1 extracts the process of setting uniqueness assurance information, from the processes performed by the distribution target server 30 and indicates its flow. This is performed using the reception of a message in which no session is generated as a trigger.

Firstly, in step S11, a session is generated by a message from the client 10. Then, in step S12, the session generation event is detected and its session ID is obtained as identification information. Then, in step S13, the address of its own distribution target server 30 (described as a "server ID" in FIG. 6) is attached to the obtained session ID, which is transmitted to the uniqueness assurance information setting management device 40. This individual process 1 is terminated with the transmission.

In the configuration illustrated in FIG. 4, step S11 can be realized by the plural-protocol connection unit 33. Step S12 can be realized by the session information monitor unit 34. Step S13 can be realized by the session information notification unit 35.

Figure 7:
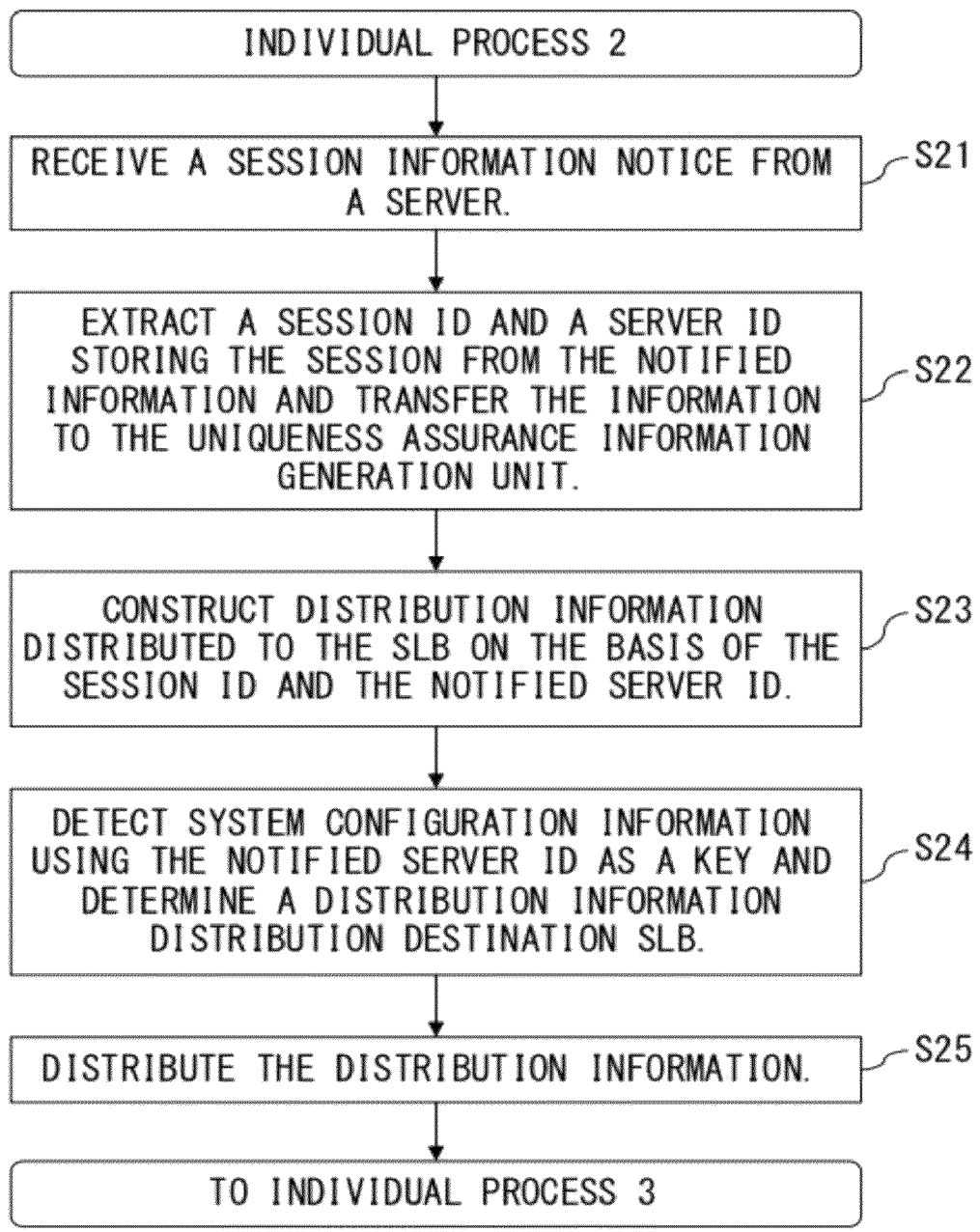
FIG. 7 is the flowchart of an individual process 2.

FIG. 7 is the flowchart of the above-described individual process 2. This individual process 2 is performed by the uniqueness assurance information setting management device 40 using the reception of a session ID or the like from the distribution target server 30 as a trigger. This can be realized by the CPU of the uniqueness assurance information setting management device 40 executing a program (uniqueness assurance information setting management program) mounting the function as the uniqueness assurance information setting management device 40.

Firstly, in step S21, a message including a session ID and address that are transmitted from the distribution target server 30 (described as a "session information notice" in FIG. 7) is received. Then, in step S22, the session ID and the address (server ID) of the distribution target server 30 storing a session to which the session ID is assigned, are extracted from the message and are transferred to the uniqueness assurance information generation unit 42. Then, the process advances to step S23.

In step S23, uniqueness assurance information (described as "distribution information" in FIG. 7) is generated (constructed) from the session ID and the address of the distribution target server 30. Then, in step S24, the system configuration information 401 is retrieved using the address of the distribution target server 30 as a key and an SLB 20 being the distribution destination of the generated uniqueness assurance information is determined. Then, in step S25, the setting of the uniqueness assurance information is requested by distributing the uniqueness assurance information to the SLB 20 that is determined as the distribution destination. The individual process 2 is terminated with the distribution.

In the configuration illustrated in FIG. 4, steps S21 and S22 can be realized by the session information collection unit 41. Steps S23 and 24 can be realized by the uniqueness assurance information generation unit 42. Step S25 can be realized by the uniqueness assurance information record requesting unit 43.

Figure 8:
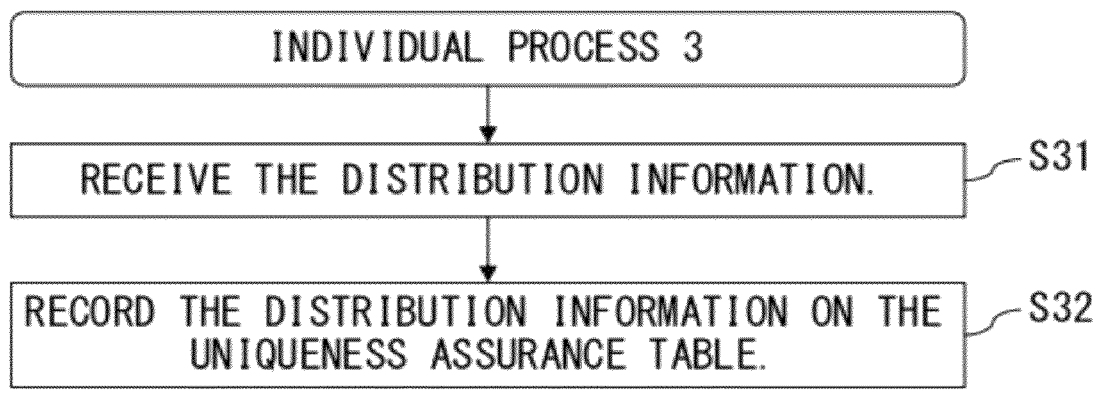
FIG. 8 is the flowchart of an individual process 3.

FIG. 8 is the flowchart of the above-described individual process 3. This individual process 3 is performed by the SLB 20 using the reception of a message for requesting for the record of uniqueness assurance information (distribution information) from the uniqueness assurance information setting management device 40.

Firstly, in step S31, a message including the uniqueness assurance information (distribution information) transmitted from the uniqueness assurance information setting management device 40 is received. Then, in step S32, the uniqueness assurance information is extracted from the message and is recorded on the per-protocol/message uniqueness assurance table 202. After the record, the individual process 3 is terminated. In the configuration illustrated in FIG. 4, this individual process 3 can be realized by the uniqueness assurance information record receiving unit 29.

Figure 9:
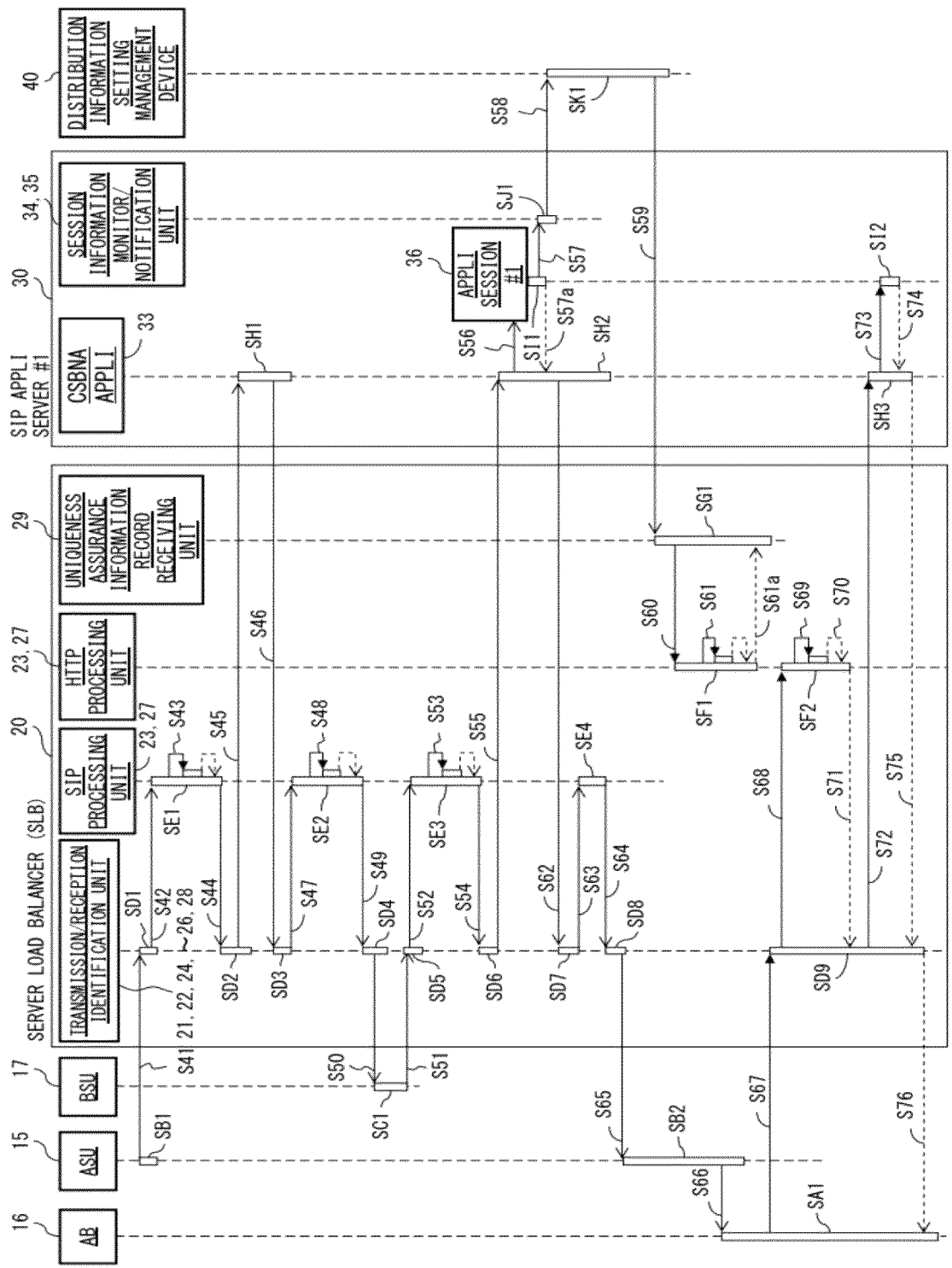
FIG. 9 is a sequence chart illustrating the operations of the client 10, the SLB 20, the distribution target server 30 and the uniqueness assurance information setting management device 40.

FIG. 9 is a sequence chart illustrating the operations of the client 10, the SLB 20, the distribution target server 30 and the uniqueness assurance information setting management device 40. Like FIG. 3, this sequence chart indicates the case where although a client being a terminal device used by Alice requests for the start of communications with a client used by Bob using an SIP, the communications cannot be started and then the client used by Alice accesses a URL (uniform resource locator) using an HTTP. It is assumed that the communications is conducted via a server (described as a "SIP appli server") being one server of the server group.

Figure 3:
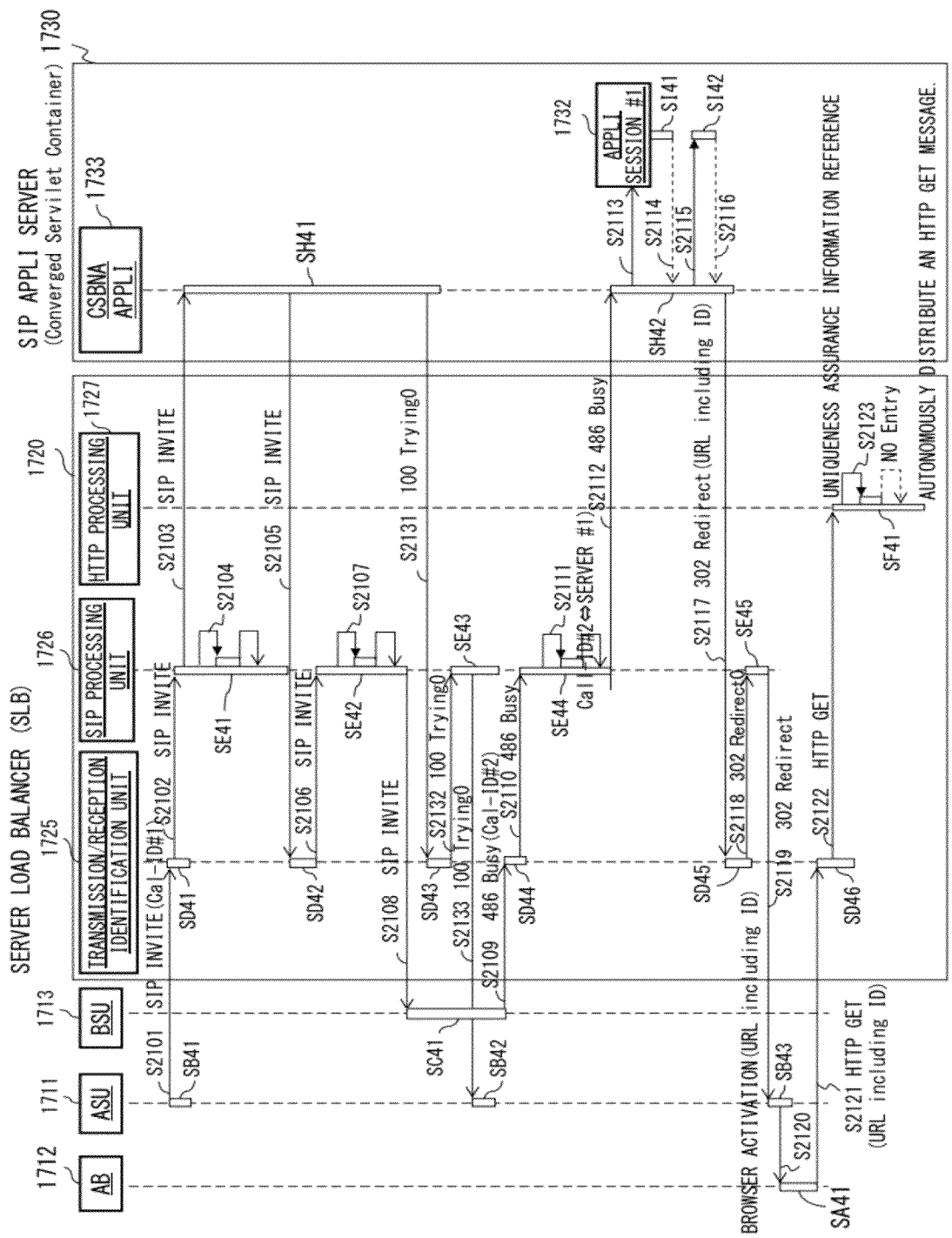
FIG. 3 is a conventional sequence chart illustrating the operations of a client, an SLB and a server in the case where load is distributed by the SLB arranged before a server group.

As in FIG. 3, in FIG. 9, the clients used by Alice and Bob are described as "ASU" ("Alice's SIP UA"), "AB" ("Alice's browser") and "BSU" ("Bob's SIP UA), to which reference numerals 15, 16 and 17, respectively, are attached. The uniqueness assurance information setting management device 40 is described as "distribution information uniqueness assurance information setting management device".

The SLB 20 includes a transmission/reception identification unit, an SIP processing unit, an HTTP processing unit and a uniqueness assurance information record receiving unit 29. The transmission/reception identification unit corresponds to the collection of the client-departing message receiving unit 21, the message identification unit 22, the client-departing message transmitting unit 24, the server-departing message receiving unit 25, the message identification unit 26 and the server-departing message transmitting unit 28. The SIP processing unit corresponds to the combination of the SIP per-protocol/message processing unit 23 and the per-protocol/message processing unit 27. As to the SLB 20, reference numeral is not attached to others than the uniqueness assurance information record receiving unit 29 in order to avoid confusion and redundancy.

The distribution target server 30 includes a CSBNA application (described as "CSBNA APPLI") 33 and a session information monitor/notification unit. The CSBNA application 33 corresponds to one example of applications for realizing the plural protocol connection unit 33. Therefore, the same reference numeral is attached to it. The session information monitor/notification unit corresponds to the combination of the session information monitor unit 34 and the session information notification unit 35, to which no reference numeral is attached in this example.

Firstly, the SIP UA 15 performs a process in step SB1 according to an Alice's instruction and transmits an INVITE request to the SLB 20 in order to start communications with Bob (sequence S41). A call ID by the SIP UA 15 is stored in the SIP header of a message for the INVITE request. This INVITE request is identified as an SIP message by the transmission/reception identification unit of the SLB 20 executing step SD1 and is transferred to the SIP processing unit (sequence S42). The SIP processing unit refers to the uniqueness assurance DB 201 and the per-protocol/message uniqueness assurance table 202 and determines its distribution destination (sequence S43) by executing step SE1, and transfers the message to the transmission/reception identification unit (sequence S44). The transmission/reception identification unit transmits the SIP message to a distribution target server 30 being the determined distribution destination by executing step SD2 (sequence S45). If it is necessary in order to realize uniqueness assurance, the combination of the call ID and the address of the distributed distribution target server 30 are registered in the uniqueness assurance DB 201 as uniqueness assurance information. In this example, no uniqueness assurance information is registered according to the above-described assumption.

The SIP message (INVITE request in this case) transmitted to the distribution target server 30 is transferred to the CSBNA application 33. The CSBNA application 33 executes step SH1, determines a call ID to be used on the Bob side (call receiving side) and returns the INVITE request storing the call ID in the SIP header to the SLB 20 (sequence S46).

The INVITE request transmitted from the distribution target server 30 is processed by the transmission/reception identification unit of the SLB 20 executing step SD3 and is transferred to the SIP processing unit (sequence S47). The SIP processing unit registers the combination of the call ID and the address of the server in the INVITE request registers in the uniqueness assurance DB 201 as uniqueness assurance information by executing step SE2 (sequence S48). After the registration, it transfers the INVITE request to the transmission/reception identification unit in order to transmit it the client of Bob (sequence S49). The transmission/reception identification unit executes step SD4 and transmits the INVITE request to the client of Bob (sequence S50).

The INVITE request transmitted to the client of Bob is processed by the SIP UA 17 executing step SC1. In this example, a 486Busy response for notifying the transmitting source (Alice) of the fact that the communications cannot be started for the reason that other communications are already conducted or the like is transmitted (sequence S51).

The 486Busy response is identified by the transmission/reception identification unit of the SLB 20 executing step SD5 and is transferred to the SIP processing unit (sequence S52). The SIP processing unit executes step SE3, refers to the uniqueness assurance DB 201 and the per-protocol/message uniqueness assurance table 202, using the call ID in the 486Busy response and specifies a distribution target server 30 to which this response to be distributed (sequence S53). The specified distribution target server 30 is notified to the transmission/reception identification unit (sequence S54). The transmission/reception identification unit transmits the 486Busy response to the specified distribution target server 30 by executing step SD6 (sequence S55).

The CSBNA application 33 of the distribution target server 30 executes step SH2 and processes the received 486Busy response. Thus, it generates a session 36 (sequence S56). In the session 36, step SI1 is executed and its ID is returned to the CSBNA application 33 (sequence S57a). The ID is transferred to the session information monitor/notification unit (sequence S57). The session information monitor/notification unit transmits the session ID and the address of its own distribution target service 30 to the uniqueness assurance information setting management device 40 by executing step SJ1 (sequence S58).

Data related to the session is stored as session data 301 by the generation of the session 36. In this example, information necessary for a return phone call, such as the SIP-URI of the calling party (Alice) and the receiver (Bob) and the like is stored as the session data 301.

The uniqueness assurance information setting management device 40 generates uniqueness assurance information from the received session ID and address of the distribution target server 30 by executing step SK1 and requests the SLB 20 to set the generated uniqueness assurance information (sequence S59). The uniqueness assurance information record receiving unit 29 of the SLB 20 transfers the message including the requested uniqueness assurance information to the HTTP processing unit by executing step SG1 (sequence S60). The HTTP processing unit executes step SF1 and registers the uniqueness assurance information in the message to its corresponding per-protocol/message uniqueness assurance table 202 (sequence S61). After the registration it notifies the uniqueness assurance information record receiving unit 29 of the fact (sequence S61a).

However, the CSBNA application 33 to which the session ID is returned generates a 302 (temporarily unavailable) response and transmits it to the SLB 20 (sequence S62). A URL obtained by embedding the session ID in a URL for accessing via an HTTP is described in the contact URI header of the 302 response.

By executing step SD7, the transmission/reception identification unit of the SLB 20 identifies the communication protocol of the 302 response and transfers it to the SIP processing unit (sequence S63). The SIP processing unit requests the transmission/reception identification unit to transmit the 302 response by executing step SE4 (sequence S64). The transmission/reception identification unit transmits the requested 302 response to the client used by Alice by executing step SD8 (sequence S65).

The 302 response transmitted to the client of Alice is processed by the SIP UA 15 executing step SB2. Thus, a browser 16 is activated (sequence S66).

The activated browser 16 transmits a HTTP GET request for accessing a URL described in the contact URI header of the 302 response by executing step SA1 (sequence S67). This request is identified by the transmission/reception identification unit of the SLB 20 executing step SD9 and is transferred to the HTTP processing unit (sequence S68). By executing step SF2, the HTTP processing unit extracts the session ID from the URL specified by the HTTP GET request, refers to the uniqueness assurance DB 201 and the per-protocol/message uniqueness assurance table 202 and specifies the distribution destination of this request (sequence S69). At this moment, since uniqueness assurance information having the session ID is registered in the per-protocol/message uniqueness assurance table 202, a distribution target server 30 storing the session 36 is determined as the distribution destination (sequence S70). Thus, the HTTP processing unit instructs the transmission/reception identification unit to transmit the HTTP GET request to the distribution target server 30 (sequence S71). As a result, the HTTP GET request is transmitted to the distribution target server 30 storing the session 36. (sequence S72).

The HTTP GET request transmitted to the distribution target server 30 is processed by the CSBNA application 33 executing step SH3. Its corresponding session 36 is specified by the session ID existing in this request and the session data 301 is obtained (sequences S73, S74 and step S12). A Web page for setting a return phone call after the finish of the communications is generated from the obtained session data 301 and is transmitted to the SLB 20 (sequence S75). This Web page is identified by the transmission/reception identification unit and after being transferred to the HTTP processing unit, it is transmitted to the client used by Alice from the transmission/reception identification unit, which is not especially illustrated in FIG. 9 (sequence S76). The transmitted Web page is processed by the browser 16.

(b) Second Embodiment

In the above-described first preferred embodiment, the transmission of a 302 response by the distribution target server 30 to the client 10 and the setting of uniqueness assurance information in the SLB 20 by the uniqueness assurance information setting management device 40 are performed in parallel. However, when the distribution target server 30 and the uniqueness assurance information setting management device 40 perform their respective processes in parallel thus, there is a possibility that unique assurance cannot be realized by another communication protocol. In other words, there is a possibility that an HTTP GET request is transmitted from the client 10 before uniqueness assurance information is registered in the per-protocol/message uniqueness assurance table 202 for HTTP. Therefore, the second preferred embodiment can be configured in such a way that uniqueness assurance can be surely realized.

The configuration of a uniqueness assurance information setting management device in the second preferred embodiment is basically the same as that of the first preferred embodiment. Its operation is also almost the same as that of the first preferred embodiment. This is similar in the SLB 20. Therefore, only components different from those of the first preferred embodiment will be explained using the same reference numerals as attached in the first preferred embodiment.

In the second preferred embodiment, the HTTP message from the client of Alice is surely distributed to a distribution target server 30 storing the session 36 by transmitting a302 response to the distribution target server 30 after setting uniqueness assurance information by the uniqueness assurance information setting management device 40. Therefore, the following parts differ from the first preferred embodiment, which will be explained in detail with reference to FIGS. 10 through 14.

Figure 10:
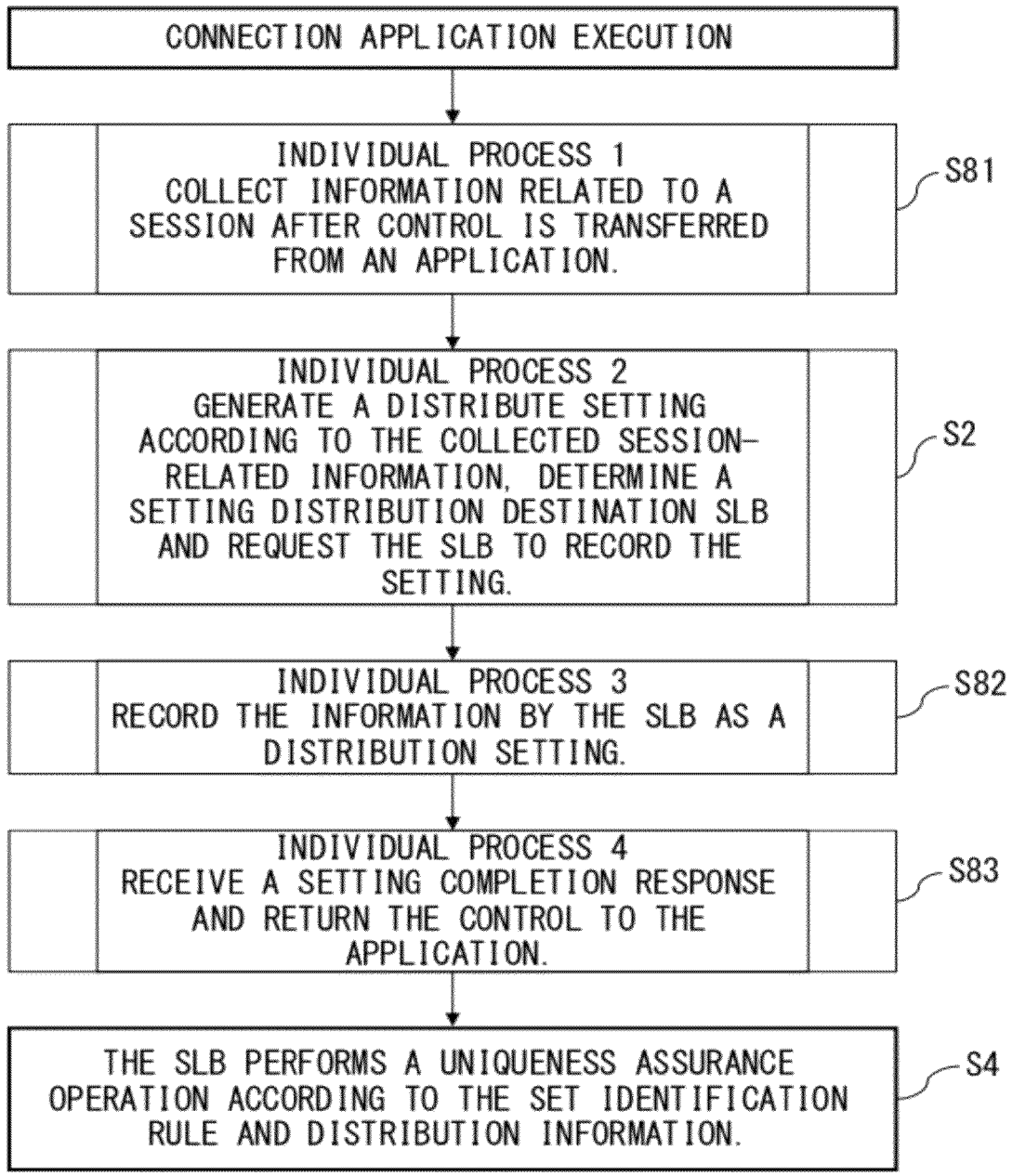
FIG. 10 illustrates the flowchart of the process performed by the SLB 20, the distribution target server 30 and the uniqueness assurance information setting management device 40 when a message is transmitted from the client 10 (the second preferred embodiment).

FIG. 10 illustrates the flowchart of the process performed by the SLB 20, the distribution target server 30 and the uniqueness assurance information setting management device 40 when a message is transmitted from the client 10. Firstly, the flow of the process in the second preferred embodiment will be explained in detail with reference to FIG. 10.

In FIG. 10, the same reference numerals are attached to the basically same processes as those of the first preferred embodiment. Therefore, as to the flowchart, only parts different from the first preferred embodiment will be explained.

Firstly, in step S81, the individual process 1 is performed in the distribution target service 30 for generating a session by distributing messages. As illustrated in FIG. 11, after the execution of step S12, in this individual process 1 the process advances to step S91 and control is transferred from the application that has generated a session to the session information monitor unit 34. Thus, the application temporarily stops, for example, the plural protocol connection unit 33. After the stoppage, the process advances to step S13.

Figure 12:
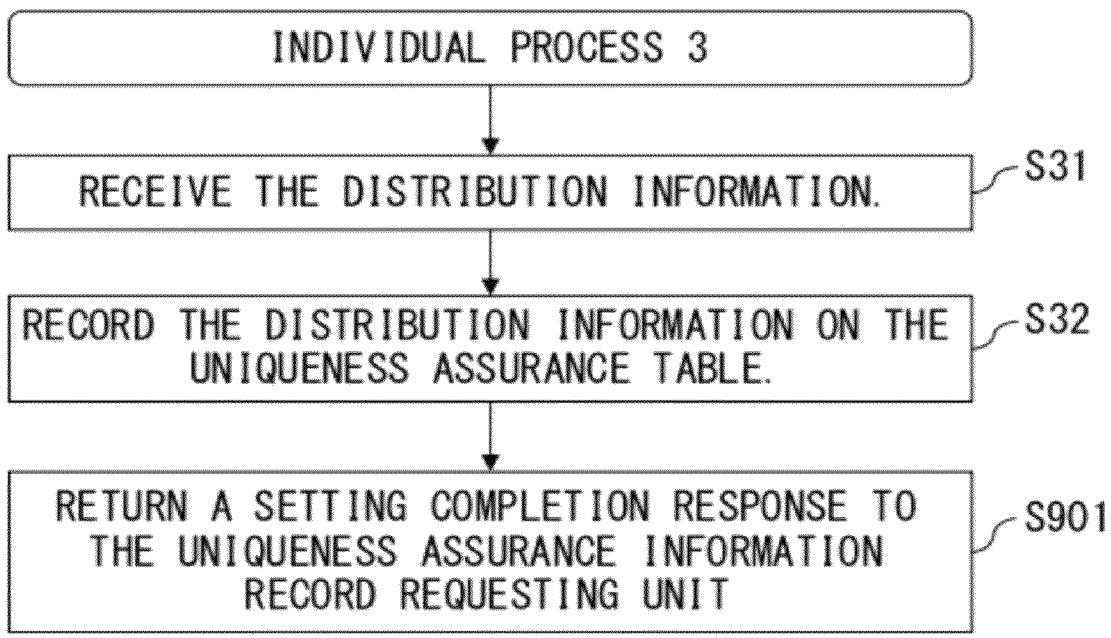
FIG. 12 is the flowchart of an individual process 3 (the second preferred embodiment).

In step S2 following step S81, the individual process 2 is performed by the uniqueness assurance information setting management device 40 and after the execution, in step S82, the individual process 3 is processed in the SLB 20. In the individual process 2, as illustrated in FIG. 12, after the execution of step S82, the process advances to step S901 and a setting completion response indicating that the setting of uniqueness assurance information is completed is returned to a uniqueness assurance information storage requesting unit 43. After the return of the response, the individual process 3 is terminated.

After the execution of the individual process 3 in step S82, the process advances to step S83. In step S83, an individual process 4 for returning the control to the application that has transferred the control in the distribution target server 30 is performed in the uniqueness assurance information setting management device 40. After the execution of the individual process 4, the process advances to step S4.

Figure 13:
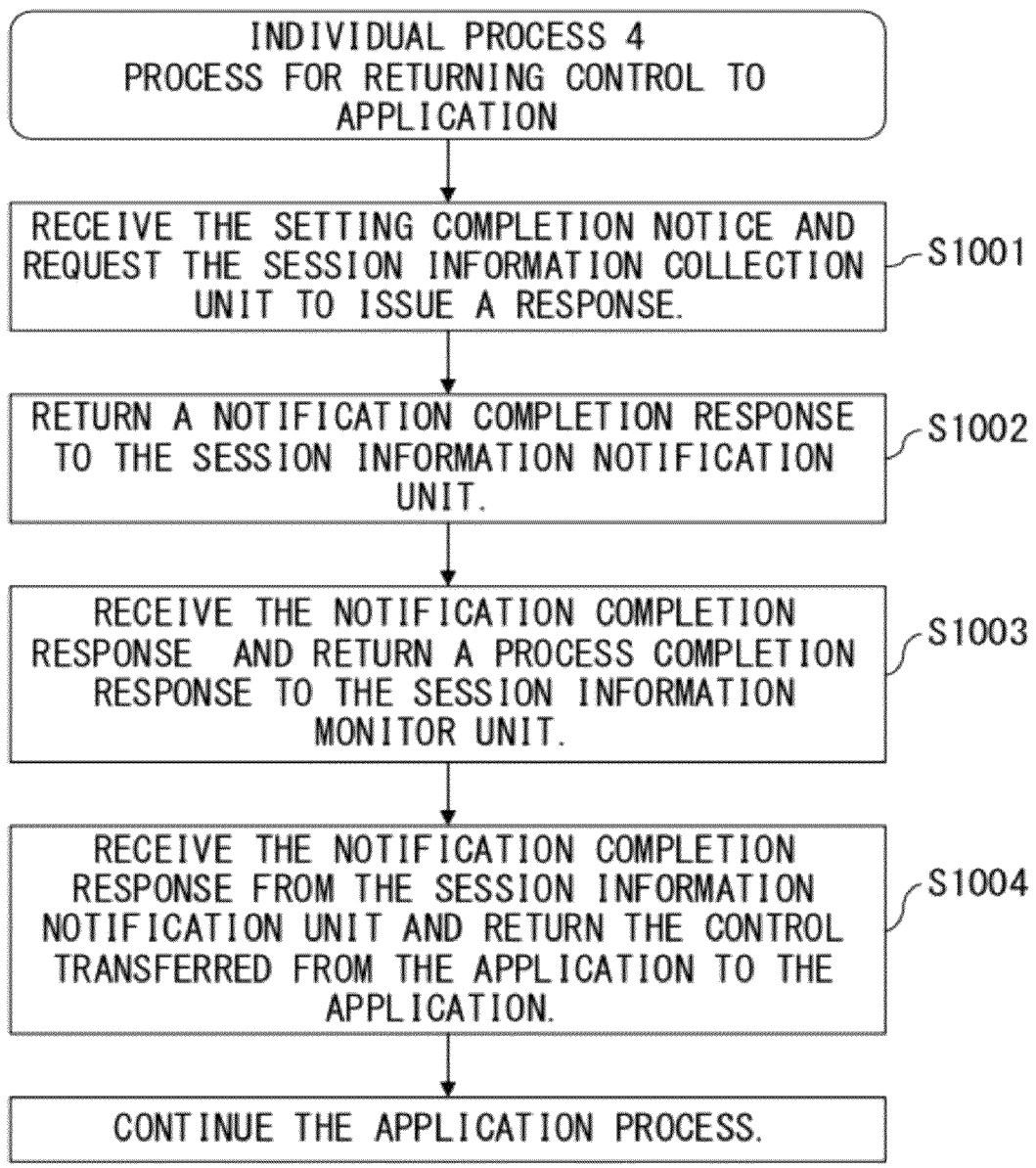
FIG. 13 is the flowchart of an individual process 4 (the second preferred embodiment).

FIG. 13 is the flowchart of the individual process 4. This individual process 4 will be explained in detail below with reference to FIG. 13. This individual process 4 includes a process performed by the distribution target server 30 besides the process of the uniqueness assurance information setting management device 40, performed using the reception of a setting completion response from the SLB 20 as a trigger. The process performed by the uniqueness assurance information setting management device 40 can be realized by the CPU of the uniqueness assurance information setting management device 40 executing a program (uniqueness assurance information setting management program) mounting a function as the uniqueness assurance information setting management device 40.

Firstly, in step S1001, upon receipt of the setting completion response, the uniqueness assurance information setting management device 40 requests the session information collection unit 41 to transmit a response for notifying the receipt of the setting completion response to the distribution target server 30. Then, in step S1002, the session information collection unit 41 transmits the response (notification completion response) corresponding to the request. Steps S1001 and 1002 are performed by the uniqueness assurance information setting management device 40. Steps 1003 and after are performed by the distribution target server 30.

Then, in step S1003, the distribution target server 30 receives the notification completion response from the session information collection unit 41 and notifies the session information monitor unit 34 of the fact. Thus, the session information monitor unit 34 executes step S1004 and returns the transferred control to the application (plural-protocol connection unit 33). After the stoppage of the application is released thus, the process advances to step S4.

Figure 14:
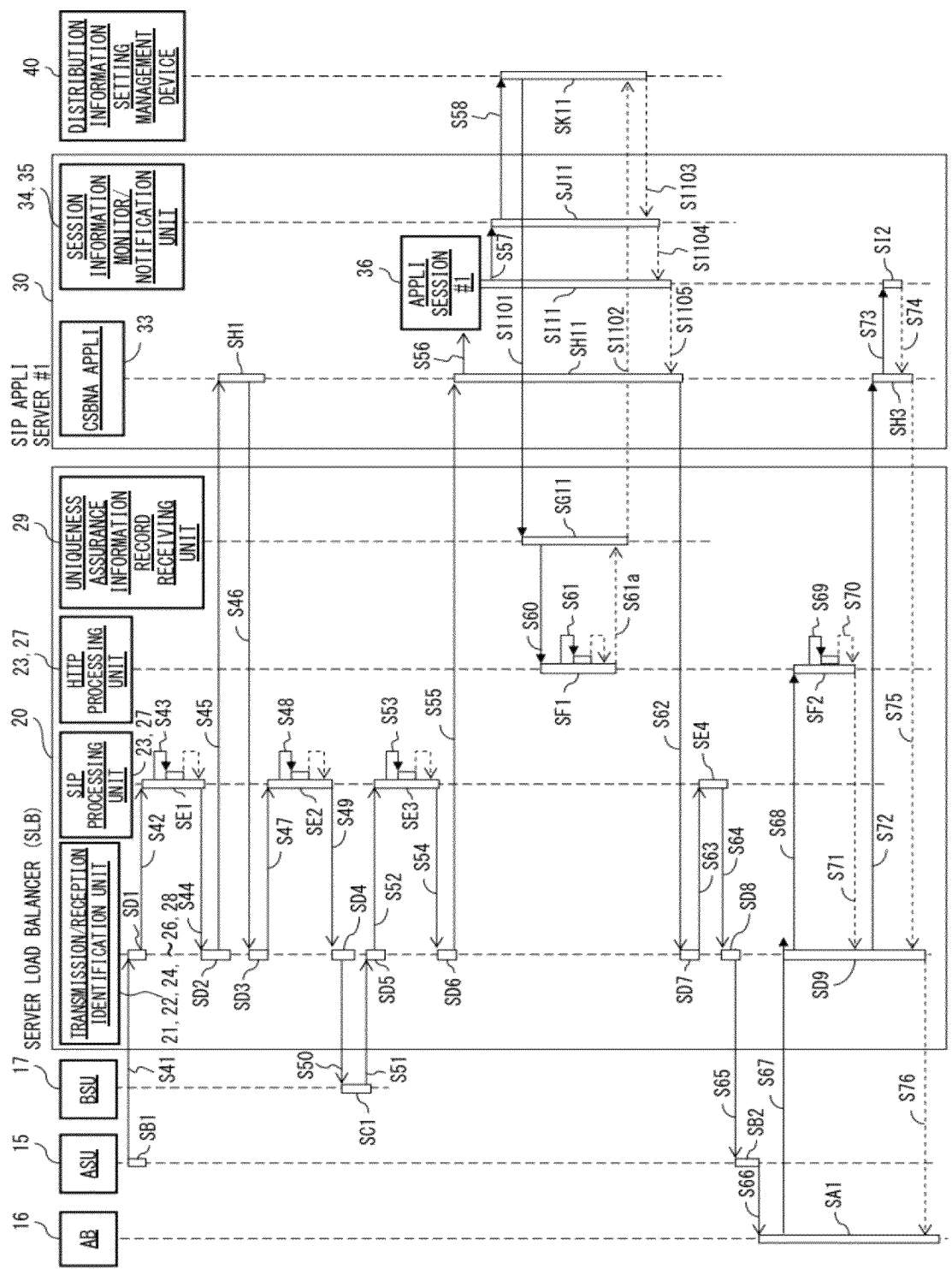
FIG. 14 is a sequence chart illustrating the operations of the client 10, the SLB 20, the distribution target server 30 and the uniqueness assurance information setting management device 40 (the second preferred embodiment).

FIG. 14 is a sequence chart illustrating the operations of the client 10, the SLB 20, the distribution target server 30 and the uniqueness assurance information setting management device 40 in the second preferred embodiment. In this sequence chart, the same reference numerals are attached to the same processes and operations as those of the first preferred embodiment. Therefore, only ones different from those of the first preferred embodiment will be explained.

In the second preferred embodiment, upon receipt of a message including a session ID and the address of a distribution target server 30 from the distribution target server 30, the uniqueness assurance information setting management device 40 executes step SK11. Thus, it requests the SLB 20 to set the generated uniqueness assurance information (sequence S1101). Steps SG11 and SF1 are executed by the request and sequences S60 through S61a are realized. When the setting of uniqueness assurance information is reported by sequence S61a, the uniqueness assurance information record receiving unit 29 transmits a setting completion response for reporting the fact to the uniqueness assurance information setting management device 40 (sequence S1102).

After requesting the SLB 20 to set uniqueness assurance information, the uniqueness assurance information setting management device 40 enters the state of waiting for the reception of this setting completion response. Upon receipt of this setting completion response, the uniqueness assurance information setting management device 40 transmits a notification completion response to the distribution target server 30 in order to notify the distribution target server 30 of the completion of the setting of the uniqueness assurance information (sequence S1103).

The CSBNA application 33 notifies the session information monitor/notification unit of the session ID accompanying the generation of the session 36, transfers the control and stops. The session information monitor/notification unit returns the control to the session 36 by executing step SJ11 (sequence S1104). Thus, the control is returned from the session 36 to the CSBNA application 33 by executing step SI11 (sequence S1105). The CSBNA application 33 to which the control is returned transmits a 302 response storing a URL in which the session ID is embedded in the contact URI header to the SLB 20 (sequence S62).

Figure 15:
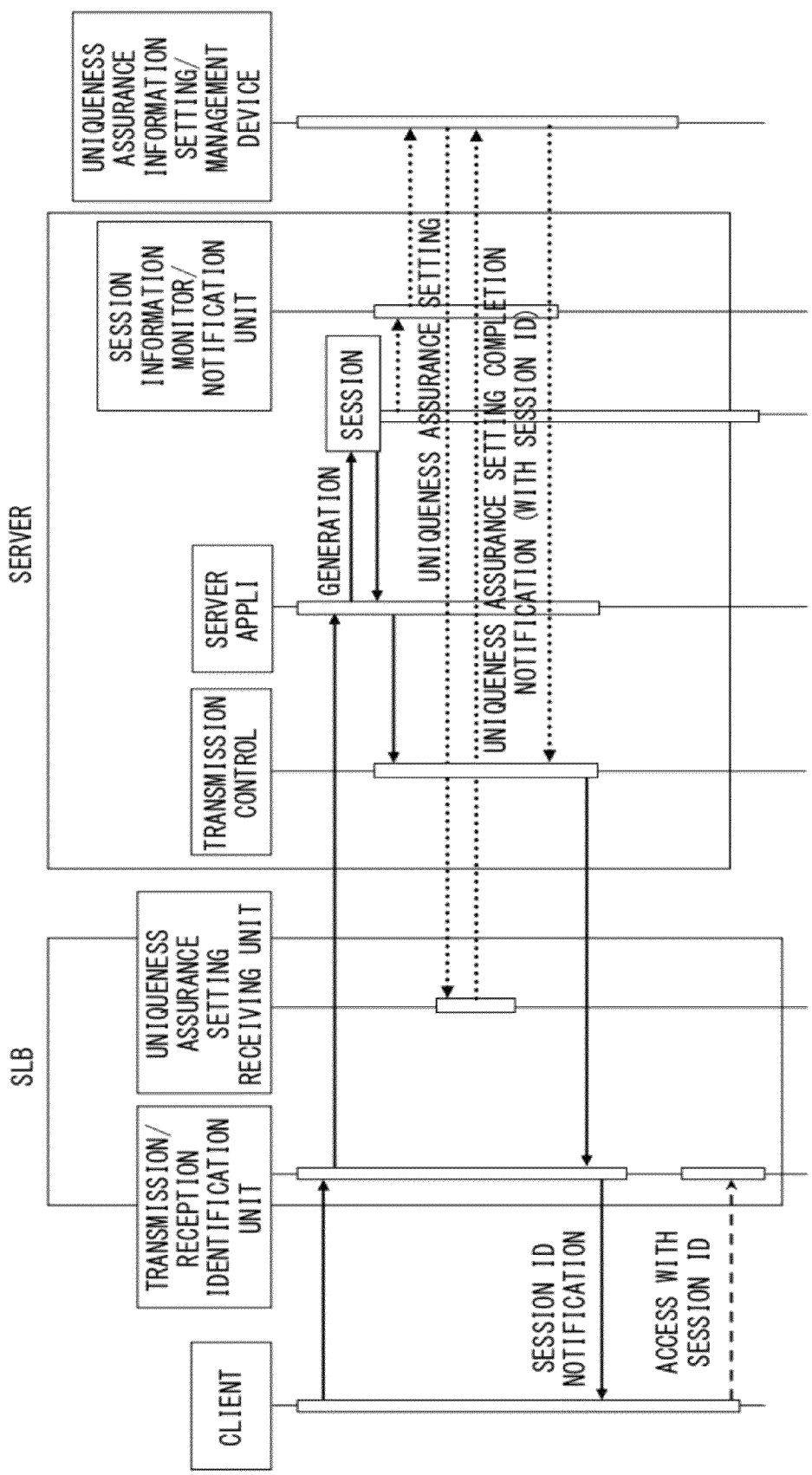
FIG. 15 is a sequence chart illustrating the operations of the client 10, the SLB 20, the distribution target server 30 and the uniqueness assurance information setting management device 40 (a variation of the second preferred embodiment).

In the second preferred embodiment, although the setting of uniqueness assurance information in the SLB 20 is completed before an HTTP message by the 302 response is transmitted from the client 10, by temporarily stopping the CSBNA application 33, another method can be also adopted. For example, as illustrated in FIG. 15, a transmitting control unit 37 for controlling the transmission/reception of a message can be also mounted on the distribution target server 30 and timing the 302 response is transmitted from the distribution target server 30 can be also adjusted. In its variation illustrated in FIG. 15, the setting completion of uniqueness assurance information is reported from the uniqueness assurance information setting management device 40 to the transmitting control unit 37 by the SLB 20 notifying the uniqueness assurance information setting management device 40 of the setting completion of uniqueness assurance information. Alternatively, the setting completion can be reported from the SLB 20 to the distribution target server 30 by the SLB 20 analyzing the requested uniqueness assurance information.

(c) Third Embodiment

In the above-described first and second preferred embodiments, the uniqueness assurance information setting management device 40 registers uniqueness assurance information in the per-protocol/message uniqueness assurance table 202 for a communication protocol, is fixed by a communication protocol that has generated a session. In the third preferred embodiment, a communication protocol by which uniqueness assurance information is set, is selected and set according to a communication protocol that has generated a session.

The configuration of a uniqueness assurance information setting management device in the third preferred embodiment is basically the same as that of the first preferred embodiment. Its operation is also almost the same as that of the first preferred embodiment. This is similar in the SLB 20. Therefore, only components different from those of the first and second preferred embodiments will be explained using the same reference numerals as attached in the first preferred embodiment.

In the third preferred embodiment, since the uniqueness assurance information setting management device 40 selects a communication protocol for setting uniqueness assurance information, the session information monitor unit 34 transfers protocol information indicating the requested communication protocol being a trigger for generating a session to which the session ID is assigned to the session information notification unit 35 besides the session ID. Thus, the session information monitor unit 34 transmits a message including the session ID, the address of its own server and the protocol information to the uniqueness assurance information setting management device 40. Therefore, in the individual process 1 illustrated in FIGS. 6 and 11, a part for obtaining the protocol information in step S12 and a part for transmitting the protocol information are added to the first and second preferred embodiment.

Figure 16:
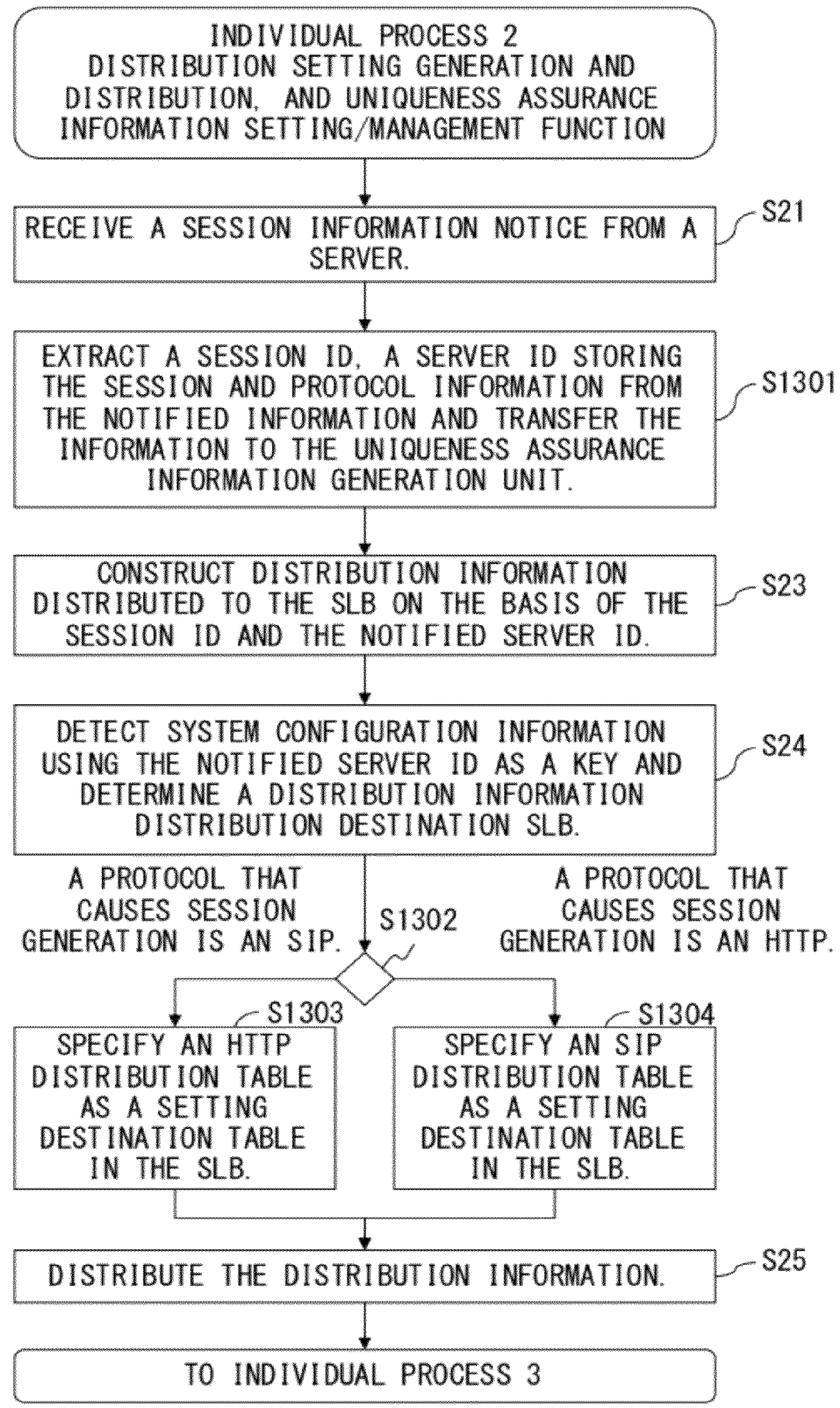
FIG. 16 is the flowchart of an individual process 2 (the third preferred embodiment).

FIG. 16 is the flowchart of the individual process 2 performed in the third preferred embodiment.

In the third preferred embodiment, after step S21, the process advances to step S1301, the session ID, the address (server ID) of the distribution target server 30 and the protocol information are extracted from the message and are transferred to the uniqueness assurance information generation unit 42. After step S24, the process advances to step 1302, the type of a communication protocol indicated by the protocol information extracted in step S1301, that is, a communication protocol being the generation trigger of the session 36 is determined. As a result, if it is determined that the communication protocol being the generation trigger is an SIP, the process advances to step S1303 and it is specified (determined) that the communication protocol of the per-protocol/message uniqueness assurance table 202, for setting the uniqueness assurance is an HTTP. If it is determined that the communication protocol being the generation trigger is an HTTP, the process advances to step S1304 and it is specified (determined) that the communication protocol of the per-protocol/message uniqueness assurance table 202, for setting the uniqueness assurance is an SIP. After either an HTTP or an SIP is specified, the process advances to step S25.

Figure 17:
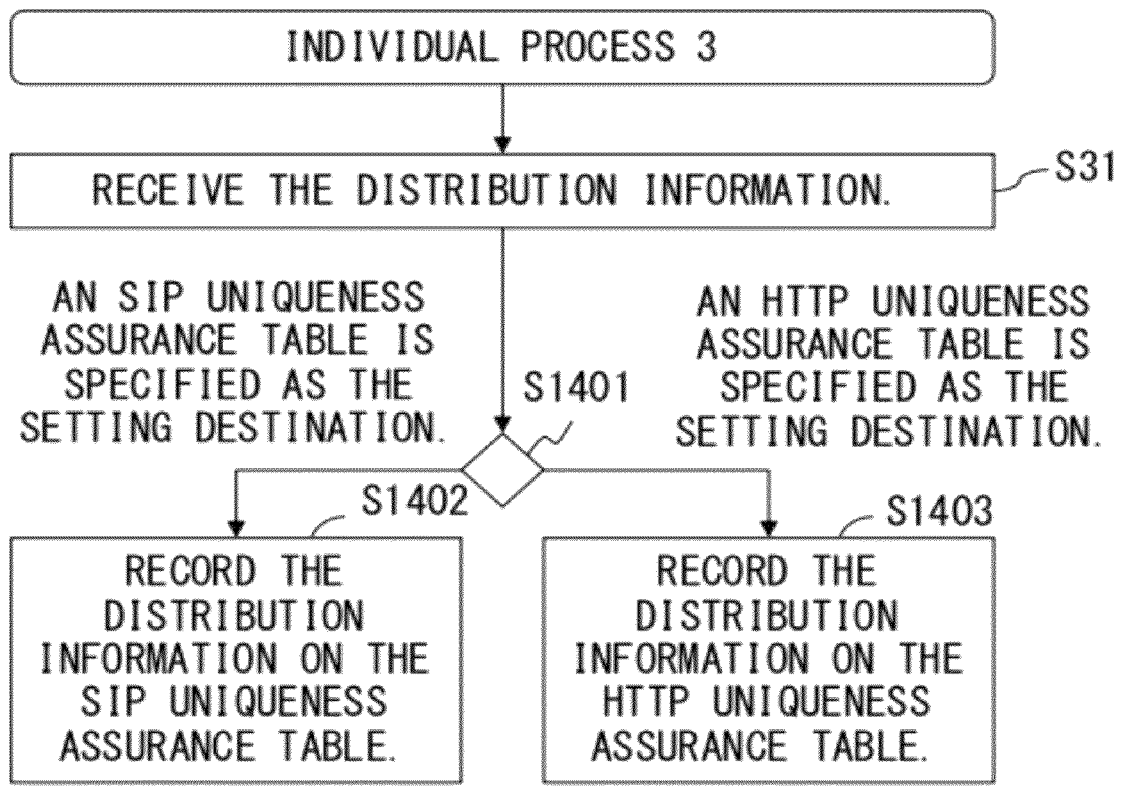
FIG. 17 is the flowchart of an individual process 3 (the third preferred embodiment).
Figure 18:
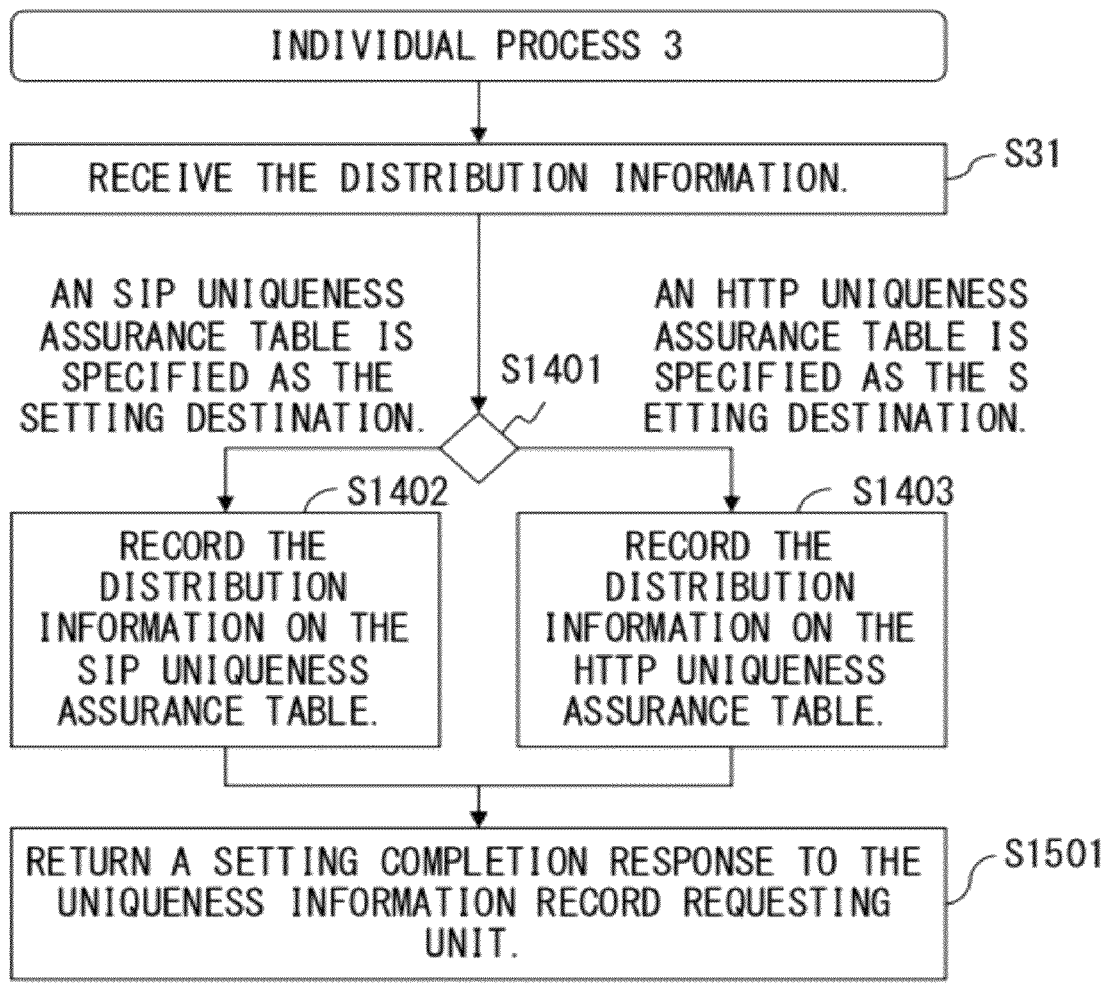
FIG. 18 is the flowchart of an individual process 3 (a variation of the third preferred embodiment).

As the individual process 3, one illustrated in either FIG. 17 or 18 is performed. In the respective individual processes in FIGS. 17 and 18, the processes of the distribution target server 30, the uniqueness assurance information setting management device 40 and the SLB 20, as illustrated in FIGS. 5 and 10, are performed.

In the individual process 3 illustrated in FIG. 17, after step S31 the process advances to step S1401 and the type of the communication protocol in the per-protocol/message uniqueness assurance table 202, specified by the uniqueness assurance information setting management device 40 is determined. As a result, if the specified communication protocol is an SIP, the process advances to step S1402 and the uniqueness assurance information is recorded on the per-protocol/message uniqueness assurance table 202 for SIP. Thus, after the uniqueness assurance information is recorded on either of the per-protocol/message uniqueness assurance tables 202 for SIP and HTTP, this individual process 3 is terminated.

However, in the individual process 3 illustrated in FIG. 18, after step S1402 or S1403, the process advances to step S1501 and a setting completion response indicating the setting of the uniqueness assurance information is completed is returned to the uniqueness assurance information setting management device 40. After the response is returned, the individual process 3 is terminated.

In the third preferred embodiment, although a communication protocol by which uniqueness assurance information is set is determined according to the communication protocol being the trigger of session generation, a communication protocol by which the uniqueness assurance information is set can also be determined according to the application by which the uniqueness assurance information is generated. This is because the combination of connectable communication protocols depends on an application. As such a combination, there are the combinations of an SIP and a SOAP (simple object-access protocol), an SOAP and an HTTP, an SOAP and an FTP (file transfer protocol), an SOAP and an SMTP (simple mail transfer protocol), an SOAP and an RTP (real-time transport protocol) and the like.

In an SIP, a message is identified by a call ID. When a session is generated in advance by an application in which an HTTP and an SIP can be connected using the reception of an HTTP message as a trigger, it is necessary for the client 10 to generate and transmit an SIP message storing a session ID for connection. Such transmission of a message can be performed according to an application for providing a service. There is no need to modify the message for a system configuration for realizing load distribution to a plurality of distribution target servers 30 by the SLB 20.

In these preferred embodiments (the first through third preferred embodiments), the uniqueness assurance information setting management device 40 is realized as a device different from the distribution target server 30 and the SLB 20, it can also be mounted on either the distribution target server 30 or the SLB 20.

In FIG. 4, the session information collection unit 41 functions as an identification information acquisition unit 45 for obtaining the identification of a session generated in the distribution target server, and the uniqueness assurance information generation unit 42 and the uniqueness assurance information record requesting unit 43 function as an assurance information setting unit 46 for setting uniqueness assurance information generated using identification information, in the SLB 20. The configurations of these identification information acquisition unit 45 and assurance information setting unit 46 vary as follows depending on a device mounting the uniqueness assurance information setting management device 40.

When the uniqueness assurance information setting management device 40 is mounted on the distribution target server 30, the session information notification unit 43 becomes unnecessary and the session information collection unit 41 is used to receive a message transmitted from another distribution target server 30. Therefore, the identification information collection unit 45 includes the session information monitor unit 34 and the session information collection unit 41. In the assumption that the uniqueness assurance information setting management device 40 is mounted on each server 30, the identification information collection unit 45 includes only the session information monitor unit 34. However, the assurance information setting unit 46 still includes the uniqueness assurance information generation unit 42 and the uniqueness assurance information record requesting unit 43.

When the uniqueness assurance information setting management device 40 is mounted on the SLB 20, for example, the session information notification unit 43 can be made unnecessary and the uniqueness assurance information generation unit 42 can transfer the generated uniqueness assurance information to the uniqueness assurance information record receiving unit 29 instead. In such an assumption, the assurance information setting unit 46 includes the uniqueness assurance information generation unit 42 and the uniqueness assurance information record receiving unit 29. In this case, the identification information collection unit 45 includes only the session information collection unit 41.

FIG. 19 illustrates one example of the hardware configuration of a computer to which the present invention can be applied. The configuration of a computer that can be used as the uniqueness assurance information setting management device 40, in other words, a computer capable of realizing the uniqueness assurance information setting management device 40 by executing the above-described uniqueness assurance information setting management program will be explained in detail below with reference to FIG. 19.

A computer illustrated in FIG. 19 includes a CPU 61, memory 62, an input device 63, an output device 64, an external storage device 65, a medium driving device 66 and a network connection device 67, which are connected to each other by a bus 68. The configuration illustrated in FIG. 19 is one example and is not restrictive of the invention.

The CPU 61 controls the entire computer.

The memory 62 is, for example, RAM for temporarily storing a program and data stored in the external storage device 65 (or a portable storage medium 70) when executing the program, updating the data, etc., and the like. The CPU 61 controls the entire computer by reading the program into the memory 62 and executing it.

The input device 63 is an interface connected to an operation device, such as a keyboard, a mouse or the like. It detects the operation of a user on the operation device and notifies the CPU 61 of the detection result.

The output device 64 is, for example, a display control device connected to a display device. The network connection device 67 is used to communicate with, for example, a plurality of distribution target servers 30 and the SLB 20 via a communication network. The external storage device 65 is, for example, a hard disk device. It is mainly used to store various types of data and programs.

The medium driving device 66 is used to access the portable storage medium 70, such as an optical disk, a magneto-optical disk or the like.

The uniqueness assurance information setting management program is recorded on the external storage device 65 or the storage medium 70 or is obtained by the network connection device 67 via a communication network. The uniqueness assurance information setting management device 40 can be realized by the CPU 61 reading the management program into the memory 62 and executing it.

(d) Fourth Embodiment Session data generated in the distribution target server 30 is deleted on a condition that a message storing the session ID is not be received for a certain time (time-out time) and is time-outed. A corresponding uniqueness assurance information managed by the SLB 20 is deleted in accordance with the deletion.

A transmission time needed until a message transmitted from the client 10 being a terminal device is actually received by the corresponding distribution target server 30 varies depending on the traffic of a communication network for connecting the client 10 to the SLB 20 and the like. When the transmission time increases, there is a possibility that the data may be time-outed before the message transmitted from the client 20 not to become the time-outed reaches the corresponding distribution target server 30. The increase of a transmission time needed until a message transmitted from the distribution target server 30 is received by the client 10 easily causes time-out. The fourth preferred embodiment manages a session generated in the distribution target server 30 in such a way as to cope with time-out due to the increase of such a transmission time.

The configurations of an SLB, each distribution target server and a uniqueness assurance information setting management device in the fourth preferred embodiment are almost the same as those in the first preferred embodiment. The operations are also almost the same as those in the first preferred embodiment. Therefore, the same reference numerals attached in the first preferred embodiment are used without changing them and only parts different from the first preferred embodiment will be explained below.

In the fourth preferred embodiment, when deleting a session, the distribution target server 30 report the deletion in advance, monitors whether a message is received from the client 10 after the notification and determines whether actually to delete the reported session on the basis of the monitor result. Thus, even when a session should be deleted, the session is not immediately deleted and by providing an allowance period during which a message can be received even after the timing, time-out due to the increase of a transmission time can be suppressed. Therefore, the occurrence of errors can also be suppressed. As a result, the load of the distribution target server 30, due to an error process can be reduced more.

In the fourth preferred embodiment, each distribution target server 30, the uniqueness assurance information setting management device 40 and the SLB 20 operate as follows.

The session information notification unit 35 of the distribution target server transmits/receives messages to/from the uniqueness assurance information setting management device 40. A plural protocol linkage unit 33 manages generated sessions (session data 301), using a result data management table 351 illustrated in FIG. 22. This result data management table 351 stores session ID indicating session (described as a "target ID" in FIG. 22), time-out time a corresponding session should be deleted and notification time being time a session is in advance reported to be deleted, for each generated session. The deletion pre-notification of a session is reported to the uniqueness assurance information setting management device 40 via the session information notification unit 35. The deletion pre-notification also includes, for example, the ID of a session to be deleted. This also applies to a message transmitted/received between the uniqueness assurance information setting management device 40 and the SLB 20 and a message transmitted from the uniqueness assurance information setting management device 40 to the distribution target server 30. The time-out time is extended for a certain predetermined time by the reception of a corresponding message.

The session information collection unit 41 of the uniqueness assurance information setting management device 40 transmits/receives messages to/from the distribution target server 30. A uniqueness assurance information record request unit 43 transmits/receives messages to/from the SLB 20. The deletion pre-notification reported from the distribution target server 30 is transferred from the session information collection unit 41 to an SLB control message processing unit 451.

The SLB control message processing unit 451 controls the SLB 20 according to a message transmitted from the plural protocol linkage unit 33 of the distribution target server 30. The control is executed using a deleted ID management table 452 as illustrated in FIG. 21. As illustrated in FIG. 22, this deleted ID management table 452 stores the ID of a session, the address of the distribution target server 30 that has generated the session (described as a "server address" in FIG. 21), its state and the latest update time of the state, for each deletion pre-notified session.

When deletion is reported in advance, the SLB control message processing unit 451 transmits a buffer start notice for instructing the storage of a message corresponding to the deletion-prenotified session received from the client 10 without transferring it to the SLB 20. The notice is transmitted via the uniqueness assurance information record request unit 43.

As described above, system configuration information 401 includes identification information for uniquely specifying an SLB 20 positioned before the distribution target server 30, such as its address, for each distribution target server 30. The SLB control message processing unit 451 refers to the system configuration information 401 and specifies an SLB 20 to which the buffer start notice to be transmitted. The specified SLB 20 is an SLB 20 positioned before the distribution target server 30 to which the deletion has been reported in advance.

The SLB 20 that has received the buffer start notice returns its response. The response is received by the uniqueness assurance information record request unit 43 and is transferred to the SLB control message processing unit 451. Thus, the SLB control message processing unit 451 transmits a deletion pre-notification response to the distribution target server 30.

In FIG. 21, "Buffer start notice" is described as the state of the deletion ID management table 452. The SLB control message processing unit 451 stores the "buffer start notice" as a state by the transmission of the buffer start notice and stores a "deletion pre-notification response" as a state by the transmission of the deletion pre-notification response to the distribution target server 30. Thus, SLB control message processing unit 451 updates the state by the transmission of a message, according to the type of the message. It also updates the latest update time in accordance with the update.

The SLB 20 stores a message corresponding to the deletion pre-notified session without transferring it by the reception of a buffer start notice. A corresponding message received from the client 10 before the storage is transferred from the SLB 20 to the distribution target server 30. The plural protocol linkage unit 33 of the distribution target server 30 to which a message is transferred stops the deletion of the deletion pre-notified session and notifies the uniqueness assurance information setting management device 40 of the fact.

The SLB control message processing unit 451 of the uniqueness assurance information setting management device 40 whose deletion suspense is reported transmits a buffer transfer notice for instructing the transfer of the message stored by a buffer start notice to the SLB 20. The corresponding state of the deleted ID management table 452 is updated to "buffer transfer".

The SLB 20 that has received the buffer start notice transfers the stored message. After that, it transfers a message without storing it.

When the SLB 20 has not transferred a message corresponding to the deletion pre-notified session before receiving buffer start notice, the plural protocol linkage unit 33 of the distribution target server 30 deletes the deletion pre-notified session. It deletes the session after receiving a deletion pre-notification response from the uniqueness assurance information setting management device 40 and notifies the uniqueness assurance information setting management device 40 of the fact.

The SLB control message processing unit 451 of the uniqueness assurance information setting management device 40 that has received a deletion completion notice indicating the deletion transmits a buffer deletion notice for instructing the deletion of a message stored by a buffer start notice to the SLB 20. The corresponding state of the deleted ID management table 452 is updated to "buffer deletion".

Figure 20:
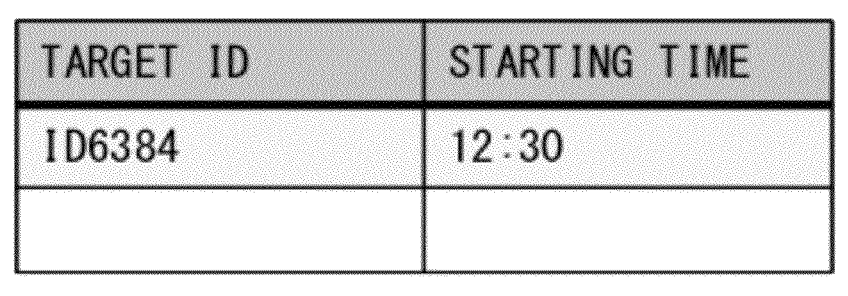

The buffer start notice transmitted to the SLB 20 is transferred from the uniqueness assurance information record receiving unit 29 to each per-protocol/message processing unit 23. The MSG distribution unit 23b of each per-protocol/message processing unit 23 stores the corresponding message in the queuing unit 251 by the reception of the buffer start notice. The storage is managed using a buffer target ID table 252 as illustrated in FIG. 20. The buffer target ID table 252 stores the starting time of the message storage for each session ID. Thus, a message having a session ID is stored in the queuing unit 251. By the reception of a buffer start notice, one of the per-protocol/message processing units 23 transmits a response to the uniqueness assurance information setting management device 40 via the uniqueness assurance information record receiving unit 29.

When receiving a buffer deletion notice from the uniqueness assurance information setting management device 40, the MSG distribution unit 23b deletes a message corresponding to the notice from the queuing unit 251 without transferring it. When receiving a buffer transfer notice, it reads a message corresponding to the notice from the queuing unit 251 and transfers it.

Figure 23:
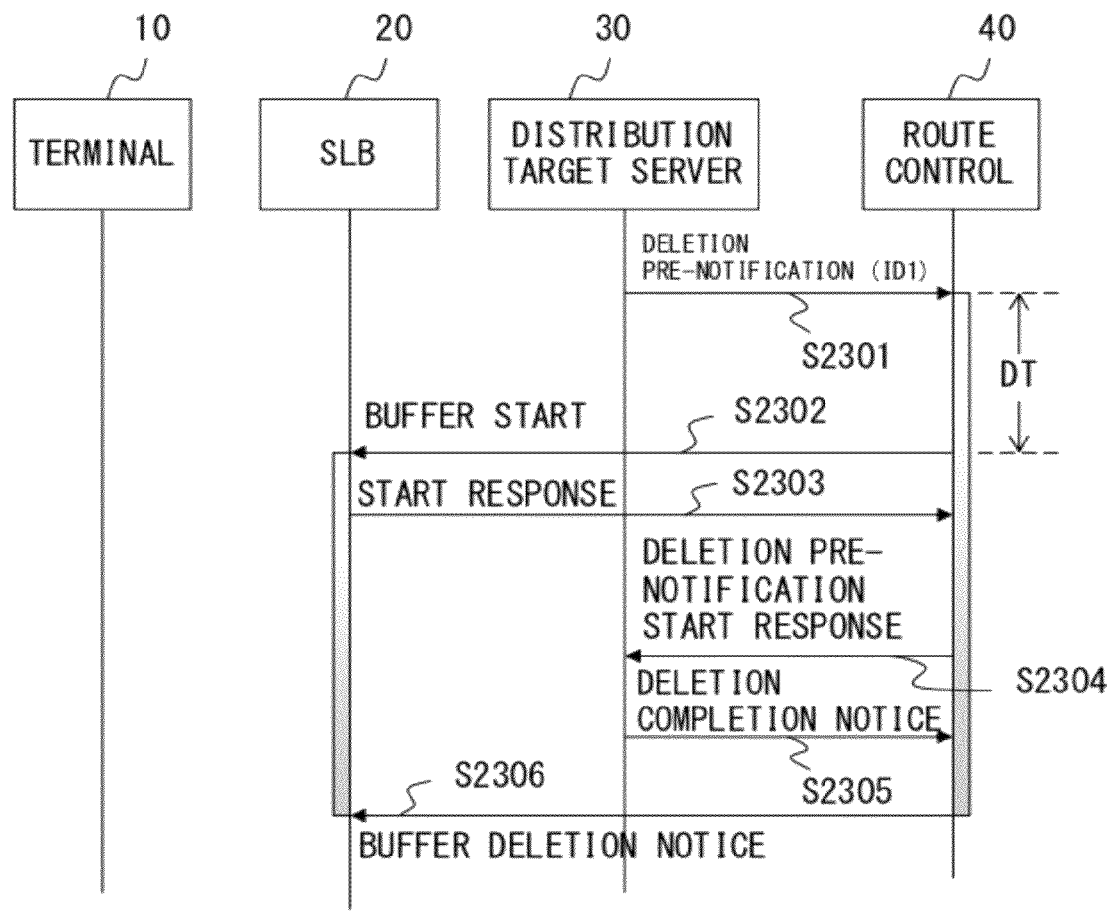
FIG. 23 is a sequence chart illustrating the operations of the SLB 20, the distribution target server 30 and the uniqueness assurance information setting management device 40 in the fourth preferred embodiment (in the case where no message is transmitted from the client 10).
Figure 24:
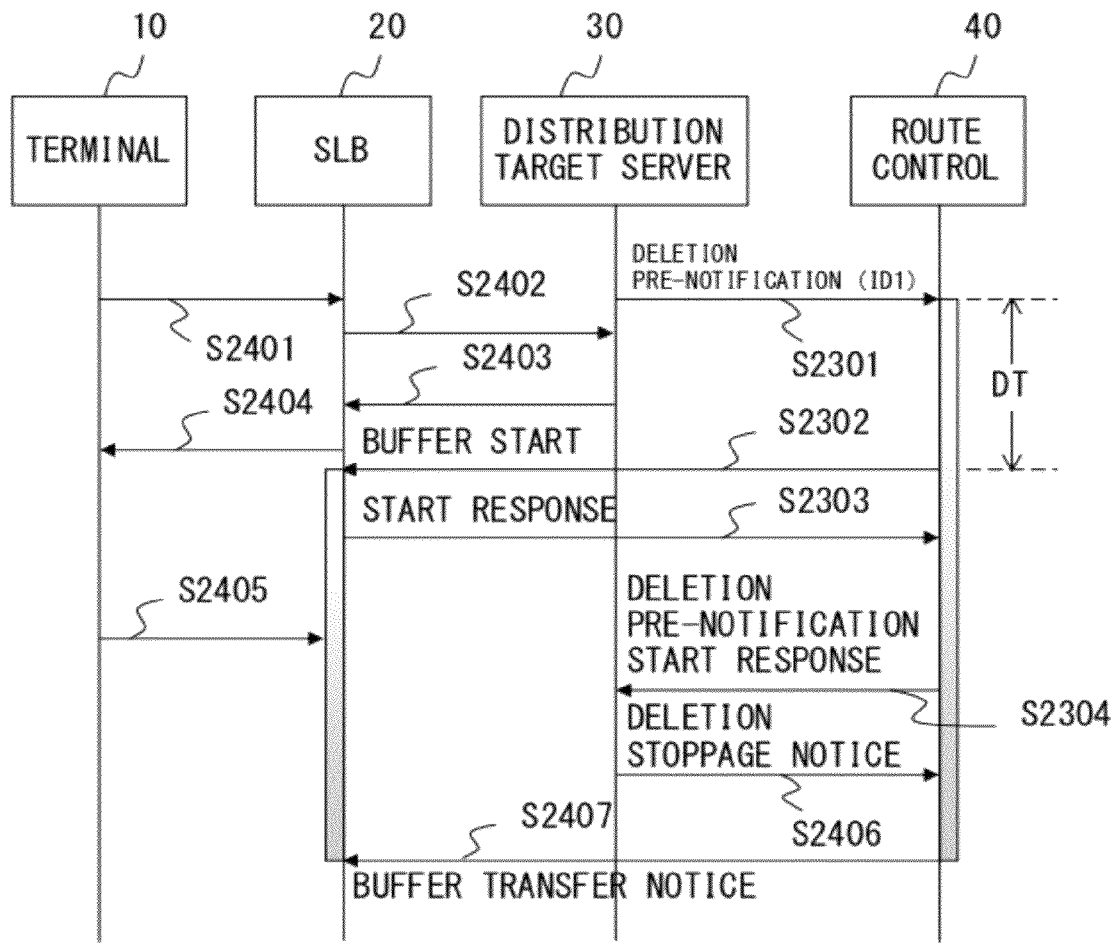
FIG. 24 is a sequence chart illustrating the operations of the SLB 20, the distribution target server 30 and the uniqueness assurance information setting management device 40 in the fourth preferred embodiment (in the case where a message is transmitted from the client 10).

FIGS. 23 and 24 are sequence charts illustrating the operations of the SLB 20, the distribution target server 30 and the uniqueness assurance information setting management device 40 in the fourth preferred embodiment. FIG. 23 illustrates the case where a corresponding message is not transmitting from the client 10 after the distribution target server 30 issues deletion pre-notification and FIG. 24 illustrates the case where a corresponding message is transmitted. Next, the operations of the SLB 20, the distribution target server 30 and the uniqueness assurance information setting management device 40 will be explained in detail with reference to FIGS. 23 and 24. In FIGS. 23 and 24, the uniqueness assurance information setting management device 40 is described as "route control".

Firstly, the operation in the case where no message is transmitted from the client 10 will be explained with reference to FIG. 23.

The distribution target server 30 transmits a deletion pre-notification for reporting in advance the deletion of a session in timing for being deleted to the uniqueness assurance information setting management device 40 (sequence S2301). The uniqueness assurance information setting management device 40 processes the received deletion pre-notification and transmits a buffer start notice to the SLB 20 (sequence S2302). The SLB 20 transmits its response (start response) to the uniqueness assurance information setting management device 40 by the reception of the buffer start notice (sequence S2303).

Upon receipt of the response, the uniqueness assurance information setting management device 40 transmits the deletion pre-notification response to the distribution target server 30 (sequence S2304). The distribution target server 30 receives no message corresponding to the deletion pre-notified session during a period DT until the uniqueness assurance information setting management device 40 transmits a buffer start notice to the SLB 20 after transmitting the deletion pre-notification. Therefore, it deletes the deletion pre-notified session and transmits a deletion completion notice indicating the fact to the uniqueness assurance information setting management device 40 (sequence S2305). Upon receipt of the deletion completion notice, the uniqueness assurance information setting management device 40 transmits a buffer deletion notice for deleting a corresponding stored message without transferring it to the SLB 20 if the message exists (sequence S2306). Next, the operation in the case where a message is transmitted from the client 10 will be explained with reference to FIG. 24. In FIG. 24, the same reference numerals are attached to the sequences having the same contents as in FIG. 23. Thus, parts different from FIG. 23 are focused and their operation will be explained.

In the case illustrated in FIG. 24, the client 10 transmits a message to the SLB 20 during a period DT until the uniqueness assurance information setting management device 40 transmits a buffer start notice to the SLB 20 after the distribution target server 30 transmits a deletion pre-notification (sequence S2401). Thus, the message is transferred to the distribution target server 30 via the SLB 20 (sequence S2402). Sequences S2403 and 2404 occur when a response is transmitted from the distribution target server 30 as a result of the message being transferred. Sequence S2405 occurs when a message is further transmitted from the client 10 that has received a response.

The distribution target server 30 stops the deletion of a deletion pre-notified session when a message is transferred during a period DT as illustrated in FIG. 24. Therefore, the distribution target server 30 that has received a deletion pre-qualification response transmits a deletion stoppage notice to the uniqueness assurance information setting management device 40 (sequence S2406). Upon the receipt of the deletion stoppage notice, the uniqueness assurance information setting management device 40 transmits a buffer transfer notice to the SLB 20 (sequence S2407).

Thus, in the fourth preferred embodiment, a period DT during which a message is transmitted from the client 10 before a session is actually deleted after it should be essentially deleted is provided. Thus, timing it is time-outed is delayed by the period DT. Therefore, time-out caused by the increase of a transmission time is suppressed and the occurrence of errors is also suppressed.

Next, the processes performed by the distribution target server 30, the uniqueness assurance information setting management device 40 and the SLB 20 will be explained in detail with reference to flowcharts illustrated in FIGS. 25 through 27.

Figure 25:
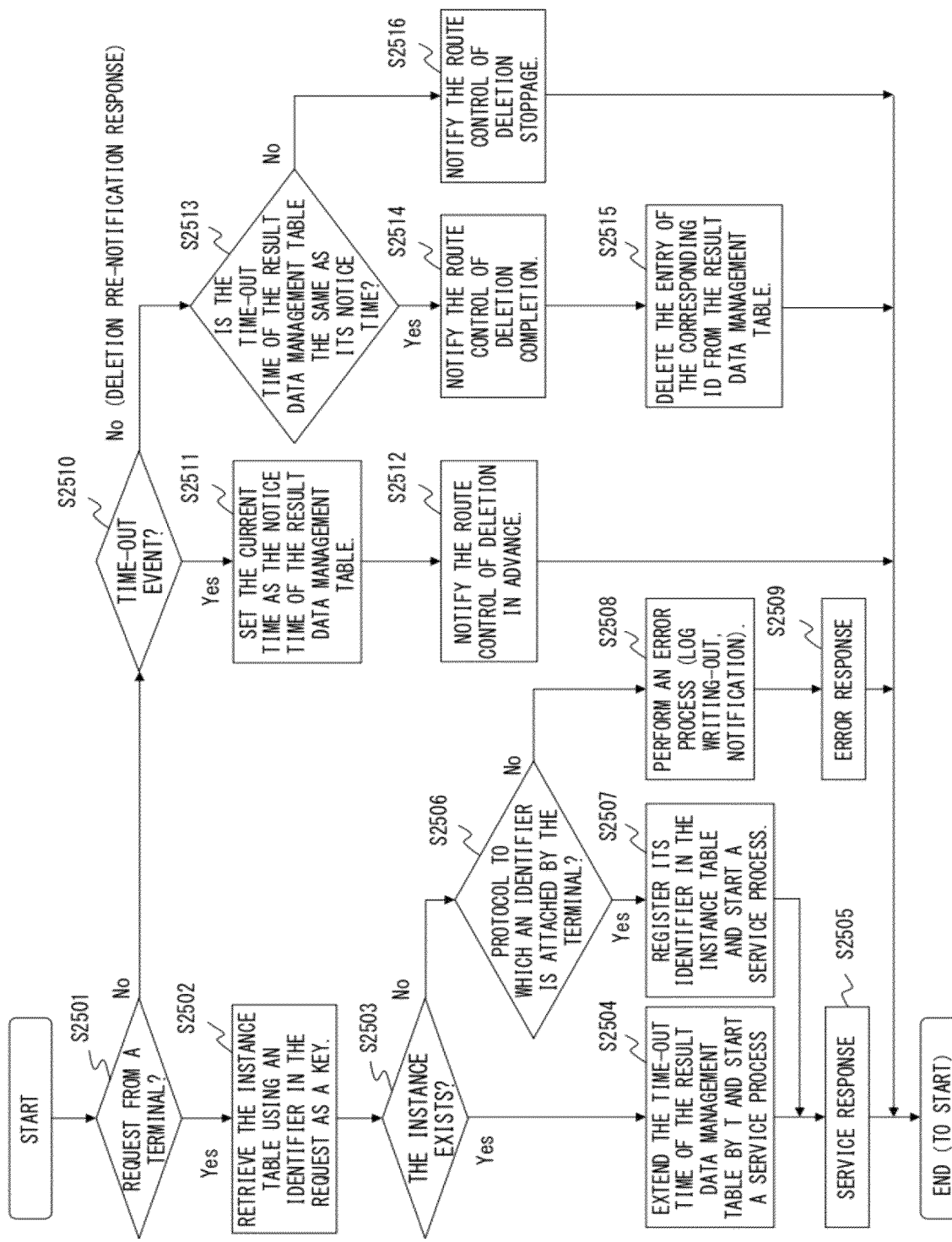
FIG. 25 is the flowchart of a process performed by a distribution target server (the fourth preferred embodiment).

FIG. 25 is the flowchart of a process performed by the distribution target server 30. This process is realized by the distribution target server 30 executing application for realizing the plural protocol linkage unit 33. Firstly, the process will be explained in detail with reference to FIG. 25. FIG. 25 extracts only parts especially relating to the management of generated sessions and illustrates their processes.

The plural protocol linkage unit 33 prepares an instance table storing the IDs of generated sessions in order to manage the generated sessions. Thus, a message having a session ID that is not stored in the instance table other than a message having an ID (identifier) determined by the client 10 becomes the target of an error process.

Firstly, in step S2501, it is determined whether a message (request) from the client 10 is transferred. If the message is transferred by the SLB 20, the determination becomes yes and the process moves to step S2502. If the message is not received, the determination becomes no and the process moves to step S2510.

In step S2502, the instance table is retrieved using a session ID (described as a "identifier" in FIG. 25) stored in the received message as a key. Then, in step S2503, it is determined whether a session (described as a "instance" in FIG. 25) corresponding to the message exists. If the session ID stored in the message is registered in the instance table, the determination becomes yes and the process moves to step S2504. If the session ID does not exist in the instance table, the determination becomes no and the process moves to step S2506.

In step S2504, the corresponding time-out time of the result data management table 351 is extended by a certain time T. In step S2505, a process for generating and returning a response to the received message is performed. After the execution, the series of processes are terminated.

In step S2506, it is determined whether a transferred message is a communication protocol to which an ID is attached by the client 10. If the transferred message is transmitted by the communication protocol (for example, a SIP message), the determination becomes yes and in step S2507, the ID of the message is registered in the instance table. Then, after a session is generated, the process moves to step S2505. If a transferred message is a communication protocol to which no ID is attached by the client 10, the determination becomes no and in step S2508 an error process, such as writing-out of a log and notification, is performed. Then, after furthermore in step S2509 an error response is issued, the series of processes is terminated.

Although if the determination in step S2501 is no, the process moves to step S2510. In step S2510, it is determined whether a time-out event reaches. If the current time coincides with any of time-out times registered in the result data management table 351, the determination becomes yes and the process moves to step S2511. If the current time coincides with neither of time-out times registered in the result data management table 351, the determination becomes no and the process moves to step S2513. In FIG. 25, it is assumed that the process moves to step S2513 only when a deletion pre-notification response is received from the uniqueness assurance information setting management device 40.

In step S2511, the current time is set as the notification time of a record whose time-out time has coincided. In step S2512 a deletion pre-notification storing the session ID of a record whose time-out time has coincided is transmitted to the uniqueness assurance information setting management device 40. After the transmission, the series of processes are terminated.

However, in step S2513 it is determined whether the time-out time of a record in the result data management table 351, specified by the session ID stored in the deletion pre-notification response coincides with the notification time of the record. If those times are matched (within an allowance range), the determination becomes yes and the process moves to step S2514. If those times are not matched, namely, if the process in step S2504 is executed by the transfer of a corresponding message, the determination becomes no and the process moves to step S2516.

In step S2514, a session having the session ID of the above-described record is deleted and a deletion completion notice indicating the fact is transmitted to the uniqueness assurance information setting management device 40. In step S2515, the record (entry) storing the session ID is deleted from the result data management table 351 and also the session ID is deleted from the instance table. Then, the series of processes are terminated.

Figure 26:
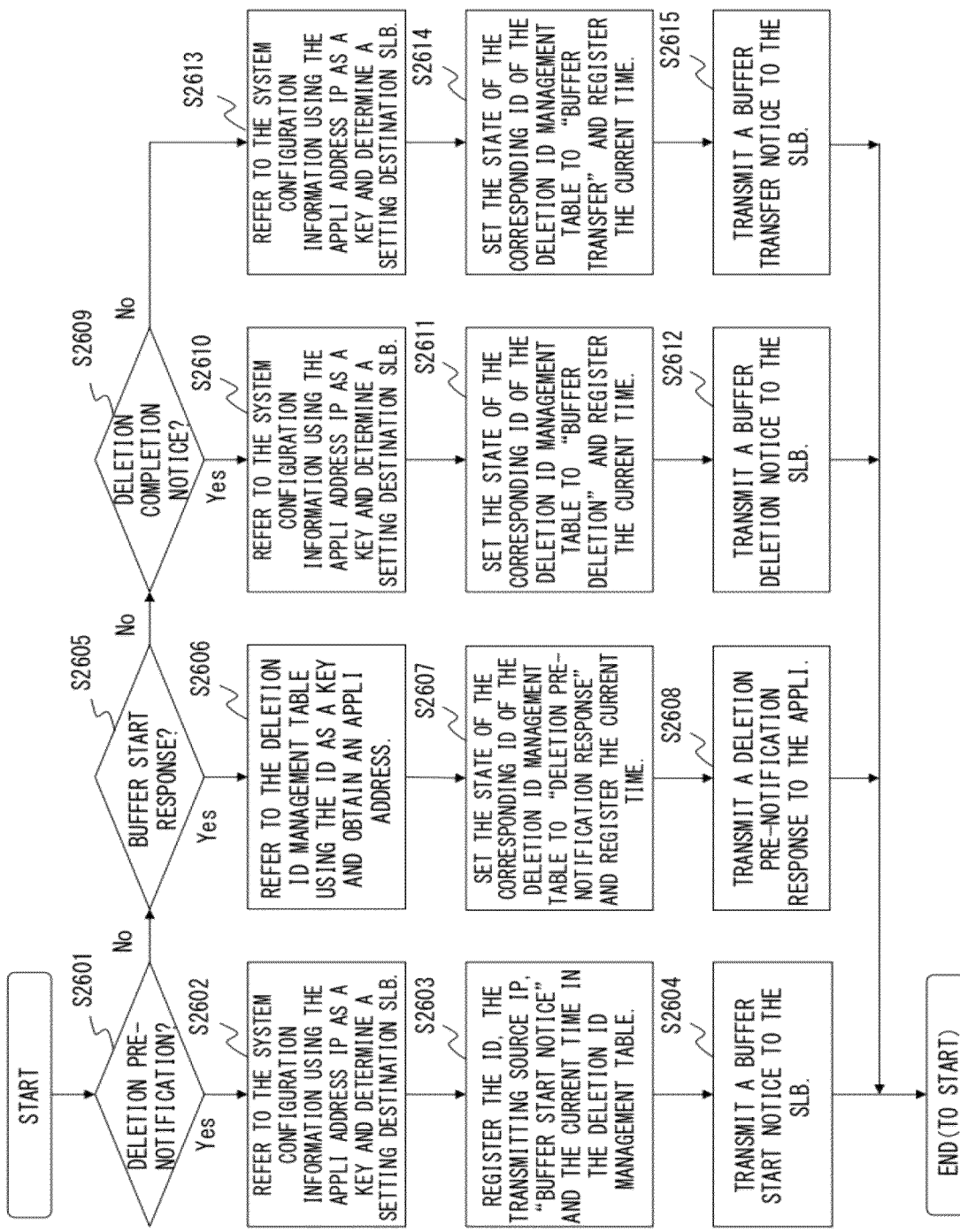
FIG. 26 is the flowchart of a process performed by a uniqueness assurance information setting management device (the fourth preferred embodiment).

FIG. 26 is the flowchart of a process performed by the uniqueness assurance information setting management device 40. This process indicates the flow of the process of parts related to the distribution target server 30 performing the process illustrated in FIG. 25. Thus, it indicates only the process of parts corresponding to the reception of a deletion pre-notification, a deletion completion notice or a deletion stoppage notice from the distribution target server 30 and the reception of a buffer start response from the SLB 20. Next, a process performed by this the uniqueness assurance information setting management device 40 will be explained in detail with reference to FIG. 26.

The SLB control message processing unit 451 is realized by performing the process illustrated in FIG. 26. The process itself illustrated in FIG. 26 is realized, for example, by a function mounted on the uniqueness assurance information setting management program.

Firstly, in step S2601 it is determined whether a received message is a deletion pre-notification. If the deletion pre-notification is received, the determination becomes yes and the process moves to step S2602. If the deletion pre-notification is not received, the determination becomes no and the process moves to step S2605.

In step S2602, the system configuration information 401 is referenced using the address (described as an "appli. Address IP") of the transmitting source distribution target server 30, stored in the deletion pre-notification as a key and an SLB 20 to which a buffer start notice should be transmitted is determined. Then, in step S2603, a record (entry) is newly registered in the deleted ID management table 452. The record stores a session ID stored in the deletion pre-notification and the address of the distribution target server 30, in which the latest update time and "buffer start notice" are set as a current time and a state. After such a record is registered, in step S2604 a buffer start notice is transmitted to a determined SLB 20. Then, the series of processes are terminated.

In step S2605 it is determined whether a buffer start response is received. If the buffer start response is received, the determination becomes yes and the process moves to step S2606. If a message other than the buffer start response is received, the determination becomes no and the process moves to step S2609.

In step S2606, the deleted ID management table 452 is referenced using the session ID stored in the buffer start response as a key and the address of a distribution target server 30 to which the deletion pre-notification response is obtained. Then, in step S2607 the state of the record from which the address of the deleted ID management is obtained and the latest update time are updated to "deletion pre-notification response" and the current time, respectively. Then, in step S2608, a deletion pre-notification response is transmitted to a distribution target server 30 having the obtained address. After, the series of processes are terminated.

In step S2609 it is determined whether a deletion completion notice is received. If the deletion completion notice is received, the determination becomes yes and the process moves to step S2610. If a message other than the deletion completion notice, that is, a deletion stoppage notice is received, the determination becomes no and the process moves to step S2613.

In step S2610 the system configuration information 401 is referenced using the address of a distribution target server 30, stored in the deletion completion notice as a key and an SLB 20 to which a buffer deletion notice should be transmitted is determined. Then, in step S2611, the state and the latest update time of a record having the session ID stored in the deletion completion notice of the deleted ID management table 452 are updated to "buffer deletion" and the current time, respectively. Then, in step S2612 a buffer deletion notice is transmitted to the determined SLB 20. After, the series of processes are terminated.

In step S2613 the system configuration information 401 is referenced using the address of a distribution target server 30, stored in the deletion stoppage notice as a key and an SLB 20 to which a buffer transfer notice should be transmitted is determined. Then, in step S2614 the state and the latest update time of a record having the session ID stored in the deletion stoppage notice of the deleted ID management table 452 are updated to "buffer transfer" and the current time, respectively. Then, in step S2615 a buffer transfer notice is transmitted to the determined SLB 20. After, the series of processes are terminated.

Thus, the uniqueness assurance information setting management device 40 transmits a deletion pre-notification to the SLB 20 in the form of a buffer start notice. Similarly, it transmits a deletion completion notice and a deletion stoppage notice to the SLB 20 in the forms of a buffer deletion notice and a buffer transfer notice, respectively. Thus, the SLB 20 operates according to the type of a message transmitted from the distribution target server 30.

Figure 27:
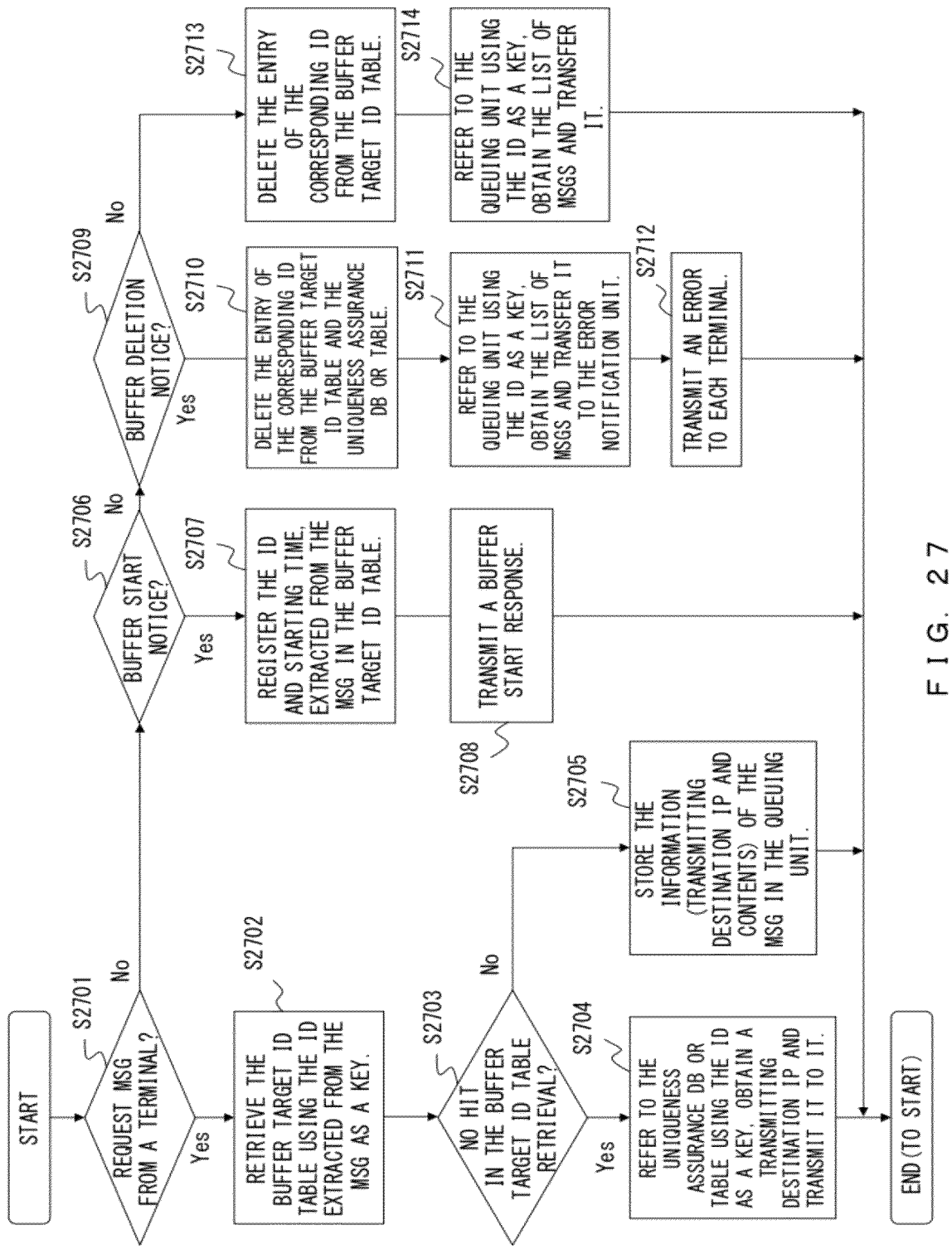
FIG. 27 is the flowchart of a process performed by an SLB.

FIG. 27 is the flowchart of a process performed by the SLB 20. This process indicates the flow of the process of parts related to the uniqueness assurance information setting management device 40 performing the process illustrated in FIG. 26. Thus, it indicates only the process of parts corresponding to the reception of a buffer start notice, a buffer deletion notice or a buffer transfer notice from the uniqueness assurance information setting management device 40 and the reception of a message from the terminal device SLB 20. Lastly, a process performed by this SLB 20 will be explained in detail with reference to FIG. 27.

The process illustrated in FIG. 27 corresponds to a process for realizing the MSG distribution unit 23b of the per-protocol/message processing unit 23. The process itself is realized by the SLB 20 executing a program (load distribution program) mounted on the SLB 20.

Firstly, in step S2701 it is determined whether a message (described as "Msg" in FIG. 27) is received from the client 10. If the message is received from the client 10, the determination becomes yes and the process moves to step S2702. If it is received from others than the client 10, the determination becomes no and the process moves to step S2706.

In step S2702, the buffer target ID table 252 is retrieved using a session extracted from the message as a key. Then, in step S2703 it is determined whether there is a hit in the retrieval of the buffer target ID table 252. If no session ID is stored in the message or a stored session ID is not registered in the buffer target ID table 252, the determination becomes yes and the process moves to step S2704. If the session ID is registered in the message, the determination becomes no and the process moves to step S2706.

In step S2704, the uniqueness assurance DB 201 and a corresponding per-protocol/message uniqueness assurance table 202 are referenced using a session ID in the message as a key, the address of a distribution target server 30 to which the message to be transferred is extracted and the message is transmitted to the distribution target server 30. If the address of a distribution target server 30 being its transfer destination cannot be extracted, the transfer destination is autonomously selected by a round robin method or the like and the message is transferred. After the transferring, the series of processes are terminated.

In step S2705 the message is stored in the queuing unit 251. After the storage, the series of processes are terminated.

In step S2706 it is determined whether the received message is a buffer start notice. If a buffer start notice is received, the determination becomes yes and the process moves to step S2707. If a message other than a buffer start notice is received from the uniqueness assurance information setting management device 40, the determination becomes no and the process moves to step S2709.

In step S2707 a record storing both a session ID extracted from the buffer start notice and starting time is registered in the buffer target ID table 252. The current time is stored as the starting time. Then, in step S2708 a buffer start response is transmitted to the uniqueness assurance information setting management device 40. After, the series of processes are terminated.

In step S2709 it is determined whether the received message is a buffer deletion notice. If a buffer deletion notice is received, the determination becomes yes and the process moves to step S2710. If a message other than a buffer deletion notice, that is, a buffer transfer notice is received from the uniqueness assurance information setting management device 40, the determination becomes no and the process moves to step S2713.

In step S2710 an entry storing an session ID extracted from the buffer deletion notice is deleted from the buffer target ID table 252 and also uniqueness assurance information having the session ID is deleted from the uniqueness assurance DB 201 or the per-protocol/message uniqueness assurance table 202. Then, in step S2711, the queuing unit 251 is reference using the session ID as a key and the list of messages storing the session ID is obtained. If a message exists in the list, namely, if a message transmitted from the client 10 exists in the queuing unit 251 in timing it fails, a message for reporting the fact is transferred to a server-oriented message transmitting unit (described as a "error notification unit" in FIG. 27) 28. Then, in step S2712 the message transferred to the server-oriented message transmitting unit 28 is transmitted to the client 10. Then, the series of processes are terminated.

In step S2713 an entry storing an session ID extracted from the buffer transfer notice is deleted from the buffer target ID table 252. Then, in step S2714 the queuing unit 251 is referenced using the session ID as a key and the list of messages storing the session ID is obtained. If the message exists in the list, namely if a message to be transferred exists in the queuing unit 251, all the messages are transferred to a distribution target server 30 to be transferred. After the transfer, the series of processes are terminated.

In the fourth preferred embodiment, each of the distribution target server 30, the uniqueness assurance information setting management device 40 and the SLB 20 perform the above-described process. Thus, even when the transmission time of a message from the client 10 increases by the period DT illustrated in FIGS. 23 and 24, the occurrence of time-out due to the increase can be avoided.

A computer illustrated in FIG. 19 can be used as the SLB 20 and the distribution target server 30. When the computer is used as the SLB 20 or the distribution target server 30, a load distribution program for realizing the SLB 20 or application for realizing the plural protocol linkage unit 33 of the distribution target server 30 is either recorded in an external storage device 65 or a storage medium 70, or obtained from a network connection device 67 via a communication network. Either the SLB 20 or (the plural protocol linkage unit 33 of) the distribution target server 30 can be realized by a CPU 61 reading and executing the program prepared thus.

Although in the fourth preferred embodiment a monitor time for monitoring a message transmitted from the client 10 is specified to be a period DT until the SLB 20 receives a buffer start notice after the distribution target server 30 transmits a deletion pre-notification notice, the monitor time is not limited to the period DT. The monitor time can be changed within a range until a session is actually deleted after it is reported in advance.

For example, when a message received from the client 10 is transferred from the SLB 20 to the distribution target server 30 before the deletion of a session is reported in advance, the period DT can be made longer. In that case, the SLB 20 plays a role of monitoring a message from the client 10.

Furthermore, although in the fourth preferred embodiment the SLB 20 unconditionally stores a message using the queuing unit 251 when receiving a buffer start notice, it can also be stored under some condition. Namely, it can also be stored after it is determined whether a message should be stored. In that case, the distribution target server 30 (the plural protocol linkage unit 33) the determination can determine it and also report the determination result. Alternatively, either the uniqueness assurance information setting management device 40 or the SLB 20 can determine it.

It is not preferable from the viewpoint of effectively using resources to keep storing a message in the SLB 20 when it receives a buffer start notice. Therefore, a state where the uniqueness assurance information setting management device 40 cannot receive either a deletion completion notice or a deletion stoppage notice from a distribution target server 30 that has transmitted a deletion pre-notification can also be coped with. In that case, the SLB control message processing unit 451 can cope with it.

When the SLB control message processing unit 451 copes with it, the SLB control message processing unit 451 manages, for example, a timer management table 461 as illustrated in FIG. 28. The timer management table 461 registers records storing a session ID, an activation time and a generation event, for each received deletion pre-notification. The activation time is a time after a certain time elapses after the deletion pre-notification is received. The generation event is an event generated before its activation time comes when either a corresponding deletion completion notice or a deletion stoppage notice cannot be received. "Deletion stoppage notice" described as such a generation event means to generate an event that a deletion stoppage notice is received from the distribution target server 30. Thus, it means to transmit a buffer transfer notice to the SLB 20. The waste of resources by storing unnecessary messages in the SLB 20 can be suppressed by preparing such a timer management table 461 and coping with a case where either a deletion completion notice or a deletion stoppage notice cannot be received from the distribution target server 30. When either a deletion completion notice or a deletion stoppage notice cannot be received from the distribution target server 30, it is OK if a record corresponding to the notice is deleted from the timer management table 461. It is because it is preferable to suppress the notice of an error to the client 10 at a minimum level that a deletion stoppage notice is assumed as a generation event. For the purpose of just suppressing the waste of resources, the generation event can be a deletion completion notice instead of a deletion stoppage notice.

Alternatively, the SLB 20 can cope with it using the above-described timer management table 461. This is because a state where the SLB 20 cannot receive either a buffer transfer notice or a buffer deletion notice from the uniqueness assurance information setting management device 40 after receiving a buffer start notice. The condition for generating an event can also be the number of stored messages or its amount of data (or the amount of data of the entire stored message) instead of a time after a certain time elapses after a deletion pre-notification is transmitted. Alternatively, a plurality of conditions can be set and an event can be generated when any of them is met.

Although in the fourth preferred embodiment a session for notifying deletion corresponds to the linkage between a plurality of communication protocols, it can also correspond to only one communication protocol. Therefore, a service provision system for providing the user of the client with services can also include one or more SLBs 20 and a plurality of distribution target servers 30, in other words, it can also include no uniqueness assurance information setting management device 40.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiment of the present invention have been described in detail, it should be understood that the various changes, substitutions, and alterations could be made hereto without departing from the spirit and scope of the invention.

The invention claimed is:

1. A non-transitory computer-accessible storage medium on which is recorded a uniqueness assurance information setting management program for enabling a computer used as a uniqueness assurance information setting management device for managing the setting of uniqueness assurance information in order to enable a server load balancer for selecting a server for providing a service requested by the terminal device from among a plurality of servers capable of providing respective services by a plurality of communication protocols to realize uniqueness assurance for distributing related requests from a terminal device, the program comprising:

uniqueness assurance information identification function capable of for referring to a uniqueness assurance information identification rule that defines information of a position in which identification information of the uniqueness assurance information is stored for each communication protocol and for each message, and identifying the identification information of the uniqueness assurance information existing in the message of a corresponding communication protocol;

identification information acquisition function capable of for obtaining identification information for identifying a session generated in a server selected from among the plurality of servers by the server load balancer in response to the request when provision of the service is requested by a first communication protocol from the terminal device; and assurance information setting function capable of for setting a corresponding relation between identification information obtained by the identification information acquisition function and the server that has generated the session corresponding to the identification information in the server load balancer as the uniqueness assurance information for the uniqueness assurance by a service of a second communication protocol;

wherein the assurance information setting function controls timing a response to a request made using the first communication protocol is transmitted to a server that has obtained identification information used to generate uniqueness assurance information to be set in the server load balancer.

2. The storage medium according to claim 1, wherein when setting completion of the uniqueness assurance information is reported by the server load balancer, the assurance information setting function notifies the server that has obtained identification information used to generate the uniqueness assurance information of the setting completion.

3. The storage medium according to claim 1, wherein the identification information acquisition function obtains protocol information indicating the first communication protocol besides the identification information and the assurance information setting function selects a second communication protocol for setting the uniqueness assurance information on the basis of the protocol information.

4. The storage medium according to claim 1, wherein the uniqueness assurance information setting management program further comprises start notice transmitting function capable of transmitting a buffer start notice for storing a request corresponding to the session, of requests transmitted from the terminal device without transferring the request when a deletion pre-notification of the session is reported from the server.

5. The storage medium according to claim 4, wherein the uniqueness assurance information setting management program further comprises transfer management function capable of notifying the server load balancer of deletion of the session by transmitting a buffer start notice for deleting the corresponding stored request without transferring the request when the deletion pre-notification of the session is reported from the server and capable of notifying the server load balancer of stoppage of deletion of the session by transmitting a buffer transfer notice for transferring the corresponding stored request when stoppage of deletion of the session is reported from the server.

6. The storage medium according to claim 4, wherein the uniqueness assurance information setting management program further comprises transfer notice transmitting function capable of transmitting a buffer transfer notice for transferring the corresponding request stored by the buffer start notice when a predetermined condition is met after the buffer start notice is transmitted by the start notice transmitting function.

7. The storage medium according to claim 6, wherein when either deletion of a session or stoppage of deletion of the session is not reported before a certain time elapses after deletion pre-notification of the session is reported in advance from the server, transfer notice transmitting function determines that the condition is met.

8. A uniqueness assurance realizing method for realizing uniqueness assurance corresponding to the connection among a plurality of communication protocols when a server load balancer selects a server for providing a service requested by a terminal device from among a plurality of servers capable of providing respective services by a plurality of communication protocols, the method comprising:

uniqueness assurance information identification process referring to a uniqueness assurance information identification rule that defines information of a position in which identification information of the uniqueness assurance information is stored for each communication protocol and for each message, and identifying the identification information of the uniqueness assurance information existing in the message of a corresponding communication protocol;

identification information acquisition process obtaining identification information for identifying a session generated in a server selected from among the plurality of servers by the server load balancer in response to the request when provision of the service is requested by a first communication protocol from the terminal device;

assurance information setting process setting a corresponding relation between identification information obtained by the identification information acquisition process and a server that has generated a session corresponding to the identification information in the server load balancer as the uniqueness assurance information for the uniqueness assurance by a service of a second communication protocol; and selection process enabling the server load balancer to refer to the uniqueness assurance information set by the assurance information setting process and to select a server for providing the service from among the plurality of servers when provision of the service is requested by the second communication protocol from the terminal device;

wherein the assurance information setting process controls timing a response to a request made using the first communication protocol is transmitted to a server that has obtained identification information used to generate uniqueness assurance information to be set in the server load balancer.

9. A uniqueness assurance information setting management device for managing setting of uniqueness assurance information for realizing uniqueness assurance for distributing related requests from a terminal device to a server load balancer for selecting a server for providing a service requested by the terminal device from among a plurality of servers capable of providing respective services by a plurality of communication protocols, the device comprising:

uniqueness assurance information identification unit capable of for referring to a uniqueness assurance information identification rule that defines information of a position in which identification information of the uniqueness assurance information is stored for each communication protocol and for each message, and identifying the identification information of the uniqueness assurance information existing in the message of a corresponding communication protocol;

an identification information acquisition unit capable of for obtaining identification information for identifying a session generated in a server selected from among the plurality of servers by the server load balancer in response to the request when provision of the service is requested by a first communication protocol from the terminal device; and an assurance information setting unit capable of for setting a corresponding relation between identification information obtained by the identification information acquisition unit and the server that has generated the session corresponding to the identification information in the server load balancer as the uniqueness assurance information for the uniqueness assurance by a service of a second communication protocol;

wherein the assurance information setting unit controls timing a response to a request made using the first communication protocol is transmitted to a server that has obtained identification information used to generate uniqueness assurance information to be set in the server load balancer;

wherein the uniqueness assurance information identification unit, identification information acquisition unit, and assurance information setting unit are executed by a processor of the uniqueness assurance information setting management device.

* * * * *